US008602891B2

(12) United States Patent
Kondo et al.

(10) Patent No.: US 8,602,891 B2
(45) Date of Patent: Dec. 10, 2013

(54) IMAGE DISPLAY SYSTEM AND ILLUMINATION DEVICE

(75) Inventors: Masahiro Kondo, Kyoto (JP); Takeshi Nagareda, Kyoto (JP); Eizi Kawai, Kyoto (JP)

(73) Assignee: Nintendo Co., Ltd., Kyoto (JP)

( * ) Notice: Subject to any disclaimer, the term of this patent is extended or adjusted under 35 U.S.C. 154(b) by 552 days.

(21) Appl. No.: 12/877,547

(22) Filed: Sep. 8, 2010

(65) Prior Publication Data

US 2011/0059795 A1 Mar. 10, 2011

(30) Foreign Application Priority Data

Sep. 10, 2009 (JP) ................................ 2009-209319
Sep. 10, 2009 (JP) ................................ 2009-209320
Oct. 14, 2009 (JP) ................................ 2009-237110

(51) Int. Cl.
*A63F 13/00* (2006.01)

(52) U.S. Cl.
USPC ................................ 463/34; 463/31; 362/234

(58) Field of Classification Search
USPC ..................... 463/30, 31, 32, 33, 34; 362/234
See application file for complete search history.

(56) References Cited

U.S. PATENT DOCUMENTS

| | | | |
|---|---|---|---|
| 7,084,888 B2 * | 8/2006 | Takahama et al. | 345/649 |
| 8,177,390 B2 * | 5/2012 | Miskin | 362/234 |
| 2002/0071271 A1 | 6/2002 | Naghi et al. | |
| 2007/0109292 A1 * | 5/2007 | Dahan et al. | 345/211 |
| 2008/0076579 A1 | 3/2008 | Tabata | |
| 2008/0297591 A1 * | 12/2008 | Aarts et al. | 348/51 |
| 2010/0097408 A1 * | 4/2010 | Michael Marcellinus et al. | 345/690 |
| 2010/0308345 A1 * | 12/2010 | Brown et al. | 257/82 |
| 2011/0059793 A1 | 3/2011 | Kondo et al. | |
| 2011/0059796 A1 | 3/2011 | Kondo et al. | |

FOREIGN PATENT DOCUMENTS

| | | |
|---|---|---|
| JP | 2004-354583 A | 12/2004 |
| JP | 2005-341122 A | 12/2005 |
| JP | 2006-310414 A | 11/2006 |
| JP | 2006-331735 A | 12/2006 |
| JP | 2007-220651 A | 8/2007 |
| WO | WO 2009/031093 A1 | 3/2009 |

OTHER PUBLICATIONS

Mar. 19, 2013 Office Action in U.S. Appl. No. 12/877,478, 8 pages.
Jan. 30, 3013 Office Action in U.S. Appl. No. 12/877,651, 7 pages.
Office Action mailed Sep. 11, 2013 in co-pending U.S. Appl. No. 12/877,651.

* cited by examiner

*Primary Examiner* — James S McClellan
(74) *Attorney, Agent, or Firm* — Nixon & Vanderhye P.C.

(57) ABSTRACT

The present invention is directed to an image display system for displaying an image on a display screen. The image display system includes a light-emitting portion, a lighting portion, a display control portion, and a lighting control portion. The light-emitting portion emits infrared light. The lighting portion sheds visible light. The display control portion performs predetermined information processing based on a detection result for the infrared light, thereby controlling image display on the display screen. The lighting control portion controls lighting by the lighting portion.

22 Claims, 14 Drawing Sheets

IMAGE DISPLAY SYSTEM AND ILLUMINATION DEVICE

CROSS REFERENCE TO RELATED APPLICATION

The disclosures of Japanese Patent Applications Nos. 2009-209319, 2009-209320, both filed Sep. 10, 2009, and 2009-237110, filed Oct. 14, 2009, are incorporated herein by reference.

BACKGROUND AND SUMMARY

1. Technical Field

The technology presented herein relates to image display systems for displaying an image on a display screen, and more particularly to an image display system for providing additional visual effects to the user along with images.

2. Description of the Background Art

Conventionally, there are game systems in which game images and suchlike are displayed on a television receiver (hereinafter, simply described as a "television") or suchlike. For example, Patent Document 1 (Japanese Laid-Open Patent Publication No. 2008-125614) discloses a game system in which the user moves a controller with his/her hand to perform a game operation, and a game image displayed on the television changes in accordance with the game operation. In this game system, an infrared light emitting device (marker portion) is installed around the television as an accompanying device of the main game apparatus. The marker portion is used by the game apparatus to calculate movement of the controller, and the game apparatus calculates the movement of the controller based on the position of the marker portion (infrared light) in an image picked up by a camera provided in the controller.

In conventional game systems, a game image resulting from a game process is simply displayed on the television screen. Accordingly, the game image displayed on the television screen is the only visual effect provided to the user, and therefore the game only produces some realistic and impressive effects in a limited manner. Also, as in the game system of Patent Document 1, an accompanying device is installed around the television, and the accompanying device does not provide any visual effect to the user together with the television.

SUMMARY

Therefore, a feature of the present technology is to provide an image display system for providing additional visual effects to the user along with images displayed on the screen.

To solve the aforementioned problem, the present invention employs the following features (1) to (21)

(1) The present technology is directed to an image display system for displaying an image on a display screen. The image display system includes a light-emitting portion, a lighting portion, a display control portion, and a lighting control portion. The light-emitting portion emits infrared light. The lighting portion sheds visible light. The display control portion performs predetermined information processing based on a detection result for the infrared light, thereby controlling image display on the display screen. The lighting control portion controls lighting by the lighting portion.

Here, the "image display system" is composed of one or more devices, and does not have to include a display device so long as it has a function of displaying an image on a display screen (display device). Also, while the "display screen" corresponds to a display screen of a television 2 connected to a game apparatus 3 in an embodiment to be described later, it may be a monitor of a personal computer, for example. Also, the "image" encompasses both still image and moving image.

The "light-emitting portion" is a concept encompassing infrared LEDs (markers 6R and 6L) in the embodiment to be described later as well as various other light-emitting devices for emitting infrared light.

The "lighting portion" is a concept encompassing light modules in the embodiment to be described later as well as various other light-emitting devices for shedding visible light on arbitrary places.

While the "display control portion" corresponds to a CPU 10 (and a GPU 11b) of the game apparatus 3 in the embodiment to be described later, any device can be employed so long as it is provided with a function of controlling display on a display device. Also, the "predetermined information processing" is a concept encompassing a game process in the embodiment to be described later as well as any other processes using detection results for infrared light as inputs.

While the "lighting control portion" corresponds to the CPU 10 or an input/output processor 11a of the game apparatus 3 or a microcomputer 28 of an illumination device 9 in the embodiment to be described later, any device can be employed so long as it controls light emission by the lighting portion.

According to the above feature (1), the image display system displays an image on a display screen and sheds light (visible light) on its surroundings through the lighting portion. Thus, it is possible to provide additional illumination effects by light shed on the surroundings, along with images, thereby providing additional visual effects to the user, including the images.

(2) The image display system may further include an input device provided with an image pickup portion capable of detecting infrared light. The display control portion performs the predetermined information processing based on a position of the infrared light in an image picked up by the image pickup portion.

Here, the "input device" corresponds to a controller 5 in the embodiment to be described later, but it does not have to include operation buttons and an acceleration sensor 37 as in the controller 5 so long as at least the image pickup portion is included. Also, while the "image pickup portion" is a solid-state pickup element, such as a CMOS sensor or a CCD sensor, in the embodiment to be described later, any image pickup element (image pickup device) can be employed so long as it is capable of detecting infrared light.

According to the above feature (2), the predetermined information processing is performed using the position of infrared light in an image picked up by the image pickup portion as an input, and therefore the user can provides an input through an operation of moving the input device provided with the image pickup portion.

(3) The display control portion may display on the display screen a game image resulting from a game process performed by the predetermined information processing. In this case, the lighting control portion controls lighting by the lighting portion in accordance with the game process.

According to the above feature (3), the image display system adds an illumination effect by the lighting portion to the game image, thereby allowing the game to offer more realistic and impressive effects.

(4) The lighting control portion may change lighting by the lighting portion in accordance with the image on the display screen.

According to the above feature (4), the image display system changes light to be shed by the lighting portion in accordance with a display image, thereby providing an additional illumination effect that matches the image.

(5) The image display system may further include an operation-receiving portion for receiving a user operation. In this case, the lighting control portion changes lighting by the lighting portion in accordance with the user operation received by the operation-receiving portion.

Note that the "operation-receiving portion" is a concept encompassing the controller 5 in the embodiment to be described later as well as any other input devices for receiving user operations.

According to the above feature (5), the image display system changes light shed by the lighting portion in accordance with a user operation, thereby providing an additional illumination effect that matches the user operation.

(6) The image display system may further include an audio output portion for outputting a sound based on the predetermined information processing. In this case, the lighting control portion changes lighting by the lighting portion in accordance with the sound outputted by the audio output portion.

While the "audio output portion" corresponds to a speaker 2a included in the display device (television 2) in the embodiment to be described later, any device can be employed so long as it has a function of outputting audio and the device may be provided independently of the display device.

According to the above feature (6), the image display system changes light shed by the lighting portion in accordance with an outputted sound, thereby providing an additional illumination effect that matches the outputted sound.

(7) The light-emitting portion may be disposed so as to emit infrared light forward from the display screen. In this case, the lighting portion is disposed so as to emit visible light rearward from the display screen.

Note that "to emit light forward from the display screen" is intended not only to strictly mean "emitting light in a direction perpendicular to the display screen" but also to broadly mean that "the emitting direction is obliquely forward to the direction parallel to the display screen". Similarly, "to emit light rearward from the display screen" is intended to mean that "the emitting direction is obliquely rearward to the direction parallel to the display screen", which encompasses the case where light is emitted slightly upward from the back of the display screen as in the embodiment to be described later.

According to the above feature (7), when the light-emitting portion is directed forward from the display screen, the lighting portion emits visible light rearward from the display screen. Accordingly, when the display device is disposed in front of a wall surface, it is possible to shed visible light on the wall surface behind the display device. Thus, visible light is shed around the display screen (see, for example, FIG. 15) as viewed from the front of the display device, thereby effectively adding an illumination effect to an image on the display screen.

(8) The image display system may further include a first housing and a second housing. The first housing has the light-emitting portion provided therein. The second housing is provided independently of the first housing and has the lighting portion provided therein.

According to the above feature (8), the first housing having the light-emitting portion and the second housing having the lighting portion are provided independently of each other, and therefore the light-emitting portion and the lighting portion can be installed freely. While the environment in which the display device (television) is installed varies from one household to another, by increasing the degree of freedom in installation, it becomes possible to arrange the light-emitting portion and the lighting portion to suit the environment.

(9) In (8) above, the second housing may be detachable from the first housing.

According to the above feature (9), the housing having the light-emitting portion and the housing having the lighting portion can be installed as a unit, making it possible to provide a user-friendly system.

(10) In (9) above, the second housing may be attached to the first housing such that the lighting portion is directed to emit visible light in a direction opposite to a direction in which the light-emitting portion emits infrared light.

According to the above feature (10), when the light-emitting portion is directed forward from the display screen as in (7) above, the lighting portion emits visible light rearward from the display screen. Thus, as in (7) above, when the display device is disposed in front of a wall surface, visible light is shed around the display screen as viewed from the front of the display device, thereby effectively adding an illumination effect to an image on the display screen.

(11) The image display system may further include a housing having the light-emitting portion and the lighting portion accommodated therein.

According to the above feature (11), the light-emitting portion and the lighting portion are provided as a unit, which saves the user the trouble of installing them separately, making it possible to provide a user-friendly system.

(12) In (11) above, the lighting portion may be disposed in the housing such that the lighting portion is directed to emit visible light in a direction opposite to a direction in which the light-emitting portion emits infrared light.

According to the above feature (12), when the light-emitting portion is directed forward from the display screen as in (7) and (10) above, the lighting portion emits visible light rearward from the display screen. Thus, as in (7) and (10) above, when the display device is disposed in front of a wall surface, an illumination effect can be effectively added to an image on the display screen.

(13) The lighting portion may emit a plurality of rays of visible light each having an elongated cross section.

Note that "having an elongated cross section" is intended to mean that the shape of light being shed on a surface perpendicular to the travel direction of the light is elongated.

According to the above feature (13), the lighting portion sheds a plurality of rays of linear light, and therefore when compared to the case where only one ray of light is shed, lighting patterns can be increased, resulting in wider variations of illumination effect.

(14) The lighting portion may include a first emitter portion and a second emitter portion. The first emitter portion emits a plurality of rays of visible light in different directions from each other. The second emitter portion emits visible light in such a direction so as to overlap with the rays of visible light emitted by the first emitter portion, the visible light having a wider cross section than those of the rays of visible light.

Here, while the "first emitter portion" corresponds to a set of linear light modules 61 to 67 for emitting linear light in the embodiment to be described later, it is not limited to any component for emitting linear light so long as a plurality of rays of visible light are emitted. Also, while the "second emitter portion" corresponds to a background light module 68 for emitting background light in the embodiment to be described later, any device can be employed so long as it emits visible light having a wider cross section than the visible light emitted by the first emitter portion.

According to the above feature (14), the rays of light from the first emitter portion and the light from the second emitter portion are shed so as to overlap with each other on a wall surface or suchlike around the lighting portion. In this case, two types of light are shed, and therefore when compared to the case where only one type of light is shed, lighting patterns can be increased, resulting in wider variations of illumination effect.

(15) The lighting portion may include light-emitting components capable of emitting light in a plurality of colors. In this case, the lighting control portion at least controls the light to be emitted by the light-emitting component in terms of color.

While the "light-emitting component" corresponds to a color LED module, which includes red, green and blue LEDs and is capable of emitting light in 256 colors, in the embodiment to be described, any light-emitting device can be employed so long as it is capable of emitting light in two or more colors.

According to the above feature (15), the color of light shed by the lighting portion can be changed, resulting in much wider variations of illumination effect.

(16) The image display system may further include a communication portion and a power control portion. The communication portion communicates with another device. The power control portion is capable of power-saving control for supplying no power at least to the display control portion while supplying power to the communication portion. In this case, when the power control portion performs the power-saving control, the lighting control portion controls lighting by the lighting portion upon reception of the predetermined data by the communication portion.

Here, the "communication portion" corresponds to a set consisting of a wireless communication module 18 and an antenna 22 for communicating with another game apparatus and various servers connected to a network in the embodiment to be described later. However, the "communication portion" may be any device for communicating with another device via wireless or infrared communication (without a network) so long as it has a function of communicating with another device outside the image display system.

Also, while the "power control portion" corresponds to a system LSI 11 for controlling power supply to each component of the game apparatus 3 in the embodiment to be described later, it does not have to control power supply to components other than the communication portion so long as it has a function of at least controlling power supply to the display control portion and the communication portion.

According to the above feature (16), the lighting portion can give notice of receipt of data from another device in cases other than the case where an additional visual effect is provided to a display image. Thus, such notice can be given even if the display device is off.

(17) The image display system may further include a brightness detection portion for detecting ambient brightness. In this case, the lighting control portion changes lighting by the lighting portion in accordance with the detection result by the brightness detection portion.

For example, the "brightness detection portion" is a light sensor or suchlike, but any sensor can be employed so long as it can detect an index of brightness in its surroundings.

According to the above feature (17), the image display system can adjust lighting by the lighting portion in accordance with ambient brightness, thereby producing an illumination effect at a suitable level for ambient brightness.

(18) Also, the image display system of the present technology may include an image pickup portion, a lighting portion, a display control portion, and a lighting control portion. The image pickup portion picks up an image of a view forward from the display screen. The lighting portion sheds visible light. The display control portion performs predetermined information processing based on the image picked up by the image pickup portion, thereby controlling image display on the display screen. The lighting control portion controls lighting by the lighting portion when the image is displayed on the display screen.

While the "image pickup portion" is, for example, a camera disposed around a television for picking up an image of a view forward from the television (as described in the "Other embodiments" section under the heading "Other exemplary game systems"), any device can be employed so long as it picks up an image of a view forward from a display device (display screen).

(19) Also, the image display system of the present invention may include a signal transmission portion, a lighting portion, a display control portion, and a lighting control portion. The signal transmission portion transmits a predetermined signal. The lighting portion sheds visible light. The display control portion performs predetermined information processing based on a detection result for the predetermined signal, thereby controlling image display on the display screen. The lighting control portion controls lighting by the lighting portion when the image is displayed on the display screen.

Note that the "signal transmission portion" is, for example, a device provided for outputting a predetermined signal, e.g., radio or ultrasonic, which is detected by an input device or suchlike and the detection result of which is used as an input for information processing.

(20) The present technology also provides an illumination device detachably connected to a display control device for controlling a display device to display an image. The illumination device includes a reception portion and a lighting portion. The reception portion receives a control instruction from the display control device. The lighting portion sheds visible light rearward from the display device in accordance with the control instruction received by the reception portion.

According to the above features (18) to (20), as in (1) above, an image is displayed on a display screen and light (visible light) is shed on the surroundings through the lighting portion. Thus, it is possible to provide additional illumination effects by light shed on the surroundings, along with images, thereby providing additional visual effects to the user, including the images.

(21) In (20) above, the lighting portion may include a first emitter portion and a second emitter portion. The first emitter portion emits a plurality of rays of visible light in different directions from each another, and each ray has an elongated cross section. The second emitter portion emits visible light in such a direction so as to overlap with the rays of visible light emitted by the first emitter portion, and the light emitted by the second emitter portion has a wider cross section than the rays of visible light emitted by the first emitter portion.

According to the above feature (21), the rays of light from the first emitter portion and the light from the second emitter portion are shed so as to overlap with each other on a wall surface or suchlike around the lighting portion. In this case, two types of light are shed, and therefore when compared to the case where only one type of light is shed, lighting patterns can be increased, resulting in wider variations of illumination effect.

According to the present technology, the lighting portion for shedding visible light is provided, so that light (visible light) is shed on the surroundings through the lighting portion while an image is displayed on a display screen, which makes it possible to add illumination effects of light on images on the display screen, thereby providing additional visual effects to the user, along with images.

These and other features, aspects and advantages of the present technology will become more apparent from the following detailed description of the present technology when taken in conjunction with the accompanying drawings.

DESCRIPTION OF THE PREFERRED EMBODIMENTS

[Overall Configuration of the Game System]

Figure 1:
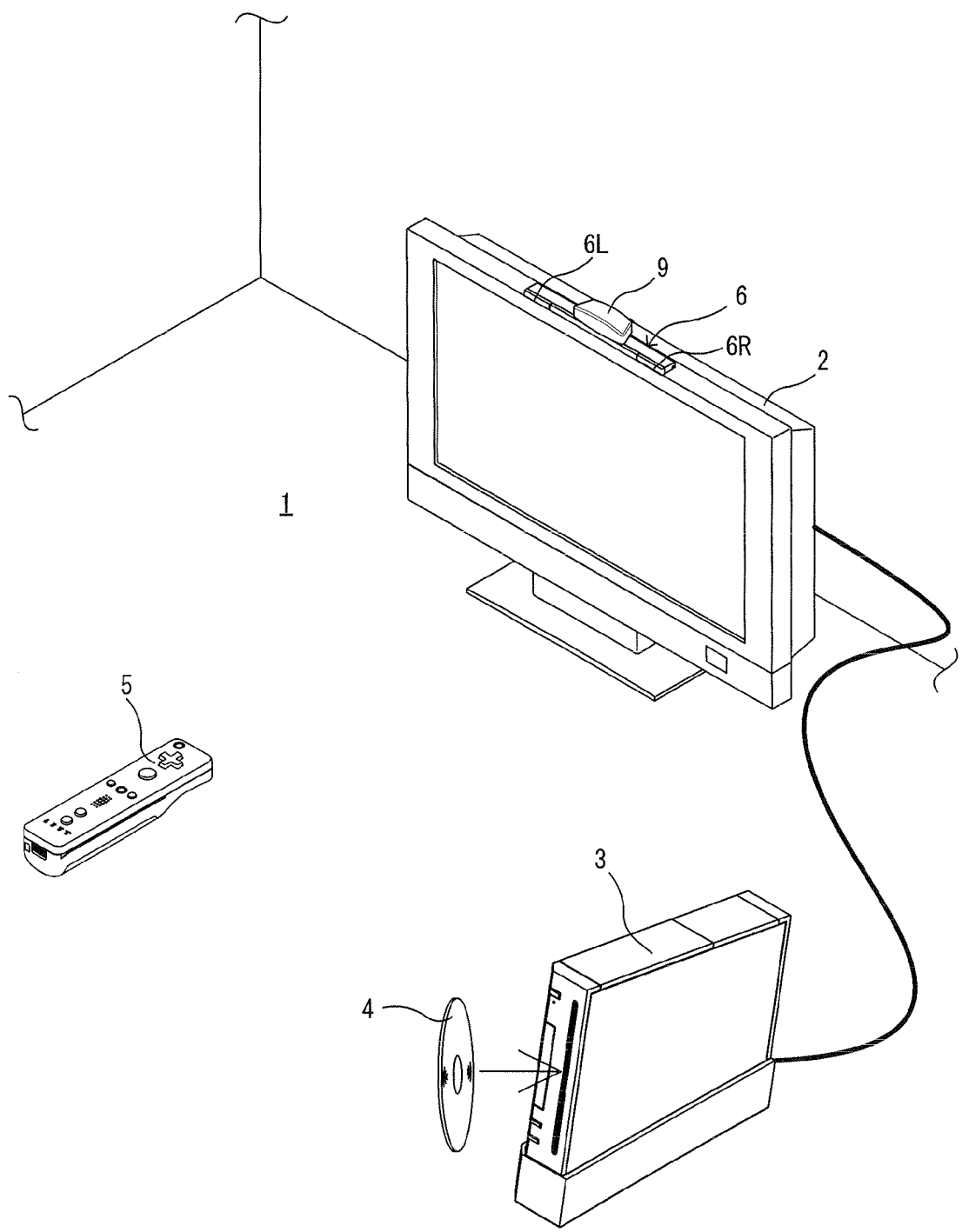
FIG. 1 is an external view of a game system 1.
Figure 2:
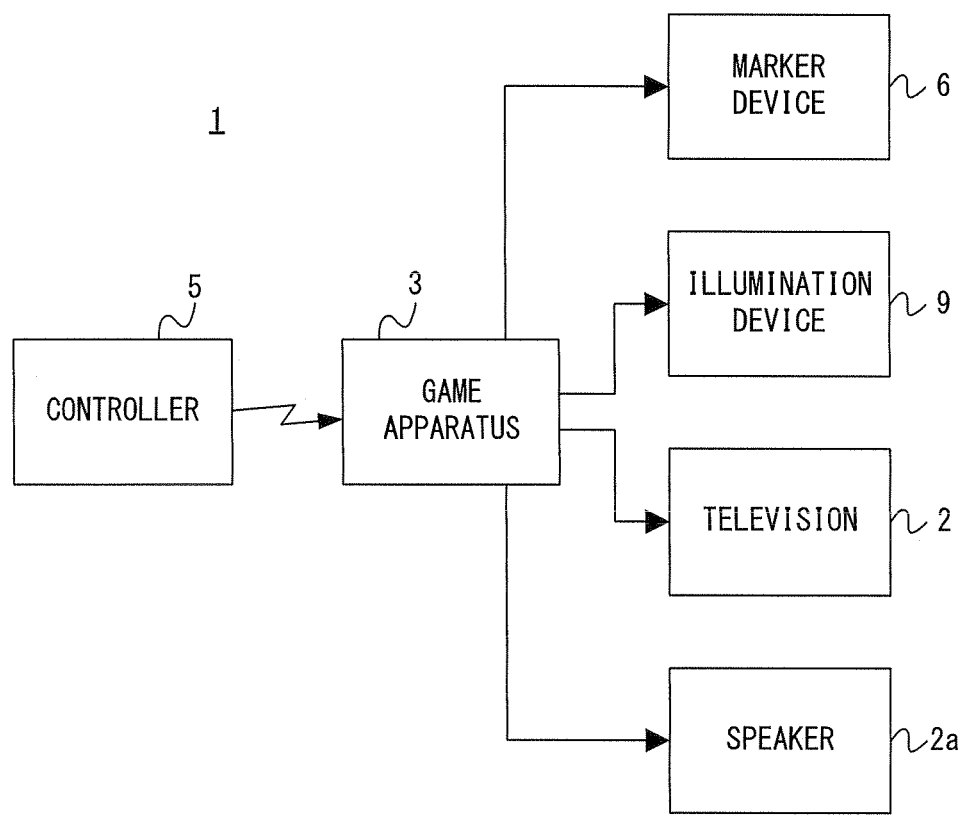
FIG. 2 is a block diagram illustrating connections between devices included in the game system 1.

Hereinafter, a game system 1, which is an exemplary image display system according to an embodiment, will be described with reference to the drawings. FIG. 1 is an external view of the game system 1. Also, FIG. 2 is a block diagram illustrating connections between devices included in the game system 1. In FIG. 1, the game system 1 includes a television receiver (hereinafter, simply described as a "television") 2, a game apparatus 3, an optical disc 4, a controller 5, a marker device 6, and an illumination device 9. The game system 1 performs a game process in the game apparatus 3 based on a game operation using the controller 5, and displays a game image or suchlike resulting from the game process on the television 2.

In the game apparatus 3, the optical disc 4 typifying an information storage medium used for the game apparatus 3 in a replaceable manner is detachably inserted. A game program executed by the game apparatus 3 is stored in the optical disc 4. The game apparatus 3 has, on the front surface thereof, an insertion opening for the optical disc 4. The game apparatus 3 reads and executes the game program stored in the optical disc 4 which is inserted through the insertion opening, so as to perform the game process. Also, the controller 5 is an input device providing the game apparatus 3 with operation data indicating the contents of the operation performed on the controller. As shown in FIG. 2, the controller 5 and the game apparatus 3 are connected via wireless communication. In the present embodiment, for example, Bluetooth (registered trademark) technology is used for the wireless communication between the controller 5 and the game apparatus 3. In another embodiment, the controller Sand the game apparatus 3 may be connected by a wire.

As shown in FIGS. 1 and 2, the game apparatus 3 is connected to the television 2 (including a speaker 2a), which is an exemplary display device, via a connecting cord. The television 2 displays a game image resulting from a game process performed by the game apparatus 3. Also, the television 2 includes the speaker 2a which outputs game audio resulting from the game process.

The marker device 6 is installed around the television 2 (in FIG. 1, above the screen). As will be described in detail later, the user can perform a game operation of moving the controller 5, and the marker device 6 is used by the game apparatus 3 to detect the movement of the controller 5. The marker device 6 includes two markers 6R and 6L at its opposite ends. Specifically, the marker 6R (and also the marker 6L) is composed of one or more infrared LEDs (Light-Emitting Diodes) for outputting infrared light forward from the television 2. As shown in FIG. 2, the marker device 6 is connected to the game apparatus 3, and the game apparatus 3 controls lighting of each infrared LED included in the marker device 6. While FIG. 1 illustrates the marker device 6 as being installed on the television 2, the position and direction in which to install the marker device 6 are optional.

Also, the illumination device 9 is installed around the television 2 (in FIG. 1, above the screen). The illumination device 9 is a device for outputting visible light for the purpose of providing additional visual effects (illumination effects) to the user along with images displayed on the television 2. As shown in FIG. 2, the illumination device 9 is connected to the game apparatus 3, and the game apparatus 3 controls light emission of the illumination device 9.

The position and direction in which to install the illumination device 9 are optional. In the present embodiment, however, the illumination device 9 is assumed to illuminate a wall (a house wall or a curtain) behind the television 2 with visible light, so that the user sees the light on the wall (see FIG. 15). Therefore, the illumination device 9 is preferably installed so as to emit visible light rearward of the television 2. Also, in FIG. 1, the illumination device 9 is installed on the marker device 6. In another embodiment, the illumination device 9 may be installed directly on the television 2 or may be installed behind the television 2 on a stand having the television 2 mounted thereon. Alternatively, the illumination device 9 may have provided therewith a member capable of hanging the illumination device at the back of the television 2.

Also, in another embodiment, the illumination device 9 may be installed so as to be readily detachable from the marker device 6. In such a case, the illumination device 9 is preferably attached to the marker device 6 so as to be positioned to emit visible light in a direction opposite to infrared light emitted from the marker device 6. As a result, it becomes possible to emit infrared light forward from the television 2 and visible light rearward from the television 2, which is advantageous when it is assumed that the illumination device 9 sheds visible light on the wall behind the television 2 as in the present embodiment.

Also, in the present embodiment, the marker device 6 and the illumination device 9 are provided as separate units, while in another embodiment, the marker device 6 and the illumination device 9 may be provided as an integral unit. Specifically, a single package may contain the infrared LED of the marker device 6 and a light module of the illumination device 9. Note that in the case where it is assumed that as in the present embodiment, the illumination device 9 sheds visible light on the wall behind the television 2, the marker device 6 and the illumination device 9 are preferably attached in the package such that the illumination device 9 emits visible light in a direction opposite to infrared light emitted from the marker device 6. As a result, it becomes possible to emit infrared light forward from the television 2 and visible light rearward from the television 2.

[Internal Structure of the Game Apparatus 3]

Figure 3:
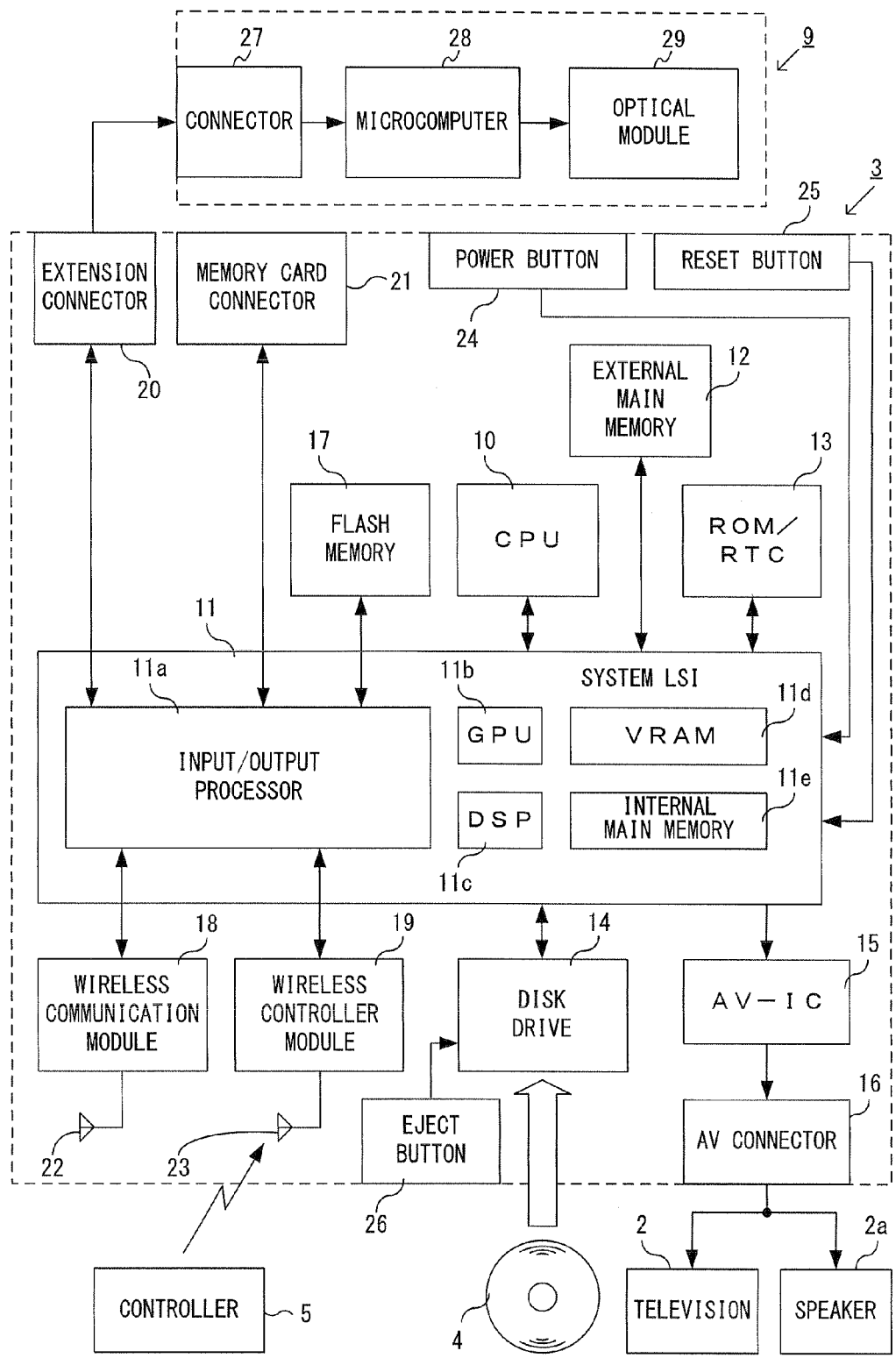
FIG. 3 is a block diagram illustrating the configuration of each device in the game system 1.

Next, an internal structure of the game apparatus 3 will be described with reference to FIG. 3. FIG. 3 is a block diagram illustrating the configuration of each device in the game system 1. The game apparatus 3 includes a CPU 10, a system LSI 11, an external main memory 12, a ROM/RTC 13, a disk drive 14, an AV-IC 15, and the like.

The CPU 10, functioning as a game processor, performs game processes by executing the game program stored in the optical disc 4. The CPU 10 is connected to the system LSI 11. To the system LSI 11, the external main memory 12, the ROM/RTC 13, the disk drive 14, and the AV-IC 15 as well as the CPU 10 are connected. The system LSI 11 performs processes for controlling data transmission between the respective components connected thereto, generating an image to be displayed, acquiring data from an external device, and the like. The internal structure of the system LSI will be described below. The external main memory 12 of a volatile type stores a program such as a game program read from the optical disc 4 and a game program read from a flash memory 17, and various data, and the external main memory 12 is used as a work area and a buffer area for the CPU 10. The ROM/RTC 13 includes a ROM (a so-called boot ROM) incorporating a boot program for the game apparatus 3, and a clock circuit (RTC: Real Time Clock) for counting time. The disk drive 14 reads program data, texture data, and the like from the optical disk 4, and writes the read data into an internal main memory 11e to be described below or the external main memory 12.

Further, the system LSI 11 includes an input/output processor (I/O processor) 11a, a GPU (Graphics Processor Unit) 11b, a DSP (Digital Signal Processor) 11c, a VRAM 11d, and the internal main memory 11e. These components 11a, 11b, 11c, 11d, and 11e are connected with each other through an internal bus, which is not shown.

The GPU 11b, acting as a part of rendering means, generates an image in accordance with a graphics command (rendering command) from the CPU 10. The VRAM 11d stores data (data such as polygon data and texture data) necessary for the GPU 11b to execute the graphics command. When an image is generated, the GPU 11b generates image data using data stored in the VRAM 11d.

The DSP 11c, functioning as an audio processor, generates audio data using sound data and sound waveform (tone quality) data stored in the internal main memory 11e or the external main memory 12.

The image data and the audio data generated as described above are read by the AV-IC 15. The AV-IC 15 outputs the read image data to the television 2 through an AV connector 16, and outputs the read audio data to a speaker 2a incorporated in the television 2. Thus, an image is displayed on the television 2, and a sound is outputted from the speaker 2a.

The input/output processor 11a performs data transmission to and data reception from the components connected thereto, and download of data from an external device. The input/output processor 11a is connected to the flash memory 17, a wireless communication module 18, a wireless controller module 19, an extension connector 20, and a memory card connector 21. The wireless communication module 18 is connected to an antenna 22, and the wireless controller module 19 is connected to an antenna 23.

The input/output processor 11a is connected to a network via the wireless communication module 18 and the antenna 22, so as to communicate with another game apparatus and various servers connected to the network. The input/output processor 11a regularly accesses the flash memory 17, and detects the presence or absence of any data which needs to be transmitted to the network, and when detected, transmits the data to the network through the wireless communication module 18 and the antenna 22. Further, the input/output processor 11a receives data transmitted from another game apparatus, and/or downloads data from a download server, through the network, the antenna 22, and the wireless communication module 18, and the received data and/or the downloaded data are stored to the flash memory 17. The CPU 10 executes a game program so as to read data stored in the flash memory 17 and use the data on the game program. The flash memory 17 may store saved data (game result data or intermediate-stage data) of a game played using the game apparatus 3 in addition to data transmitted from the game apparatus 3 to another game apparatus or the various servers, and data received by the game apparatus 3 from another game apparatus or the various servers.

The input/output processor 11a receives operation data transmitted from the controller 5 through the antenna 23 and the wireless controller module 19, and (temporarily) stores the received operation data to a buffer area of the internal main memory 11e or the external main memory 12.

Further, the input/output processor 11a is connected to the extension connector 20 and the memory card connector 21. The extension connector 20 is a connector for an interface, such as USB or SCSI, and allows communication with the network by connecting thereto a medium such as an external storage medium, connecting thereto another peripheral device such as a controller, and/or connecting thereto a wired communication connector, without using the wireless communication module 18. In the present embodiment, the extension connector 20 is used for connecting the illumination device 9 to the game apparatus 3. The memory card connector 21 is a connector for connecting thereto an external storage medium such as a memory card. For example, the input/output processor 11a accesses an external storage medium through the extension connector 20 or the memory card connector 21 to store data in the external storage medium or read data from the external storage medium.

The game apparatus 3 includes a power button 24, a reset button 25, and an eject button 26. The power button 24 and the reset button 25 are connected to the system LSI 11. When the power button 24 is on, power is supplied to the respective components of the game apparatus 3 through an AC adaptor not shown. When the reset button 25 is pressed, the system LSI 11 reboots a boot program of the game apparatus 3. The eject button 26 is connected to the disk drive 14. When the eject button 26 is pressed, the optical disc 4 is ejected from the disk drive 14.

Note that in the present embodiment, when the power button 24 is turned on, the system LSI 11 sets a mode (referred to as a "normal mode") in which power is supplied to each component of the game apparatus 3 via an unillustrated AC adaptor, thereby bringing the component into normal conductive state. On the other hand, when the power button 24 is turned off, the system LSI 11 sets a mode (hereinafter, referred to as a "sleep mode") in which power is supplied to apart of the components of the game apparatus 3, thereby performing power-saving control for keeping power consumption at a minimum level. In the present embodiment, when the sleep mode is set, the system LSI 11 provides an instruction to stop power supply to components other than the input/output processor 11a, the flash memory 17, the external main memory 12, the ROM/RTC 13, the wireless communication module 18, and the wireless controller module 19. Accordingly, the sleep mode is a mode in which no application is executed by the CPU 10. However, in the sleep mode also, the game apparatus 3 can receive external data, and data transmitted from other game apparatuses and download servers is stored to the flash memory 17.

Note that the system LSI 11 is supplied with power even during the sleep mode. However, during the sleep mode, the system LSI 11 stops supplying clocks to some of its components: the GPU 11b, the DSP 11c and the VRAM 11d. As a result, these components are not driven, which reduces power consumption. Although not shown, the game apparatus 3 has a fan provided in the housing in order to discharge heat from ICs such as the CPU 10 and the system LSI 11. During the sleep mode, the fan is also stopped.

In addition, the game apparatus 3 can be switched between the normal mode and the sleep mode through a remote operation by pressing the power button of the controller 5. Note that when such switching is not performed by the remote operation, the wireless controller module 19 may be supplied with no power during the sleep mode. Also, the user may instruct the game apparatus 3 to not employ the sleep mode. In the case where the sleep mode is not employed, when the power button 24 is turned off, power supply to all circuits is completely stopped.

The illumination device 9 is detachably connected to the game apparatus 3 via the extension connector 20. The illumination device 9 is a device for emitting visible light for the purpose of providing additional visual effects to the user along with images displayed on the television 2. As shown in FIG. 3, the illumination device 9 includes a connector 27, a microcomputer 28, and a light module 29. The connector 27 is detachably connected to the extension connector 20 of the game apparatus 3 via an unillustrated cable. Note that the game apparatus 3 and the illumination device 9 may communicate by any possible method, and in another embodiment, they may communicate wirelessly.

Also, the microcomputer 28 is connected to the connector 27, and the light module 29 is connected to the microcomputer 28. The light module 29 is composed of a plurality of light-emitting devices each emitting visible light. In the present embodiment, the light module 29 consists of a plurality of color LED modules capable of emitting light in their respective colors. Note that the detailed configuration of the light module 29 will be described later. The microcomputer 28 is a circuit for controlling light emission of the light module 29. The game apparatus 3 transmits data to the illumination device 9, thereby specifying colors of light to be emitted by the light module 29. The microcomputer 28 acquires the data transmitted from the game apparatus 3 via the connector 27, and controls light emission of the light module 29 in accordance with the data. Note that the illumination device 9 may be supplied with power via an unillustrated AC adaptor (i.e., independently of the game apparatus 3) or by the game apparatus 3.

[Configuration of the Controller 5]

Figure 4:
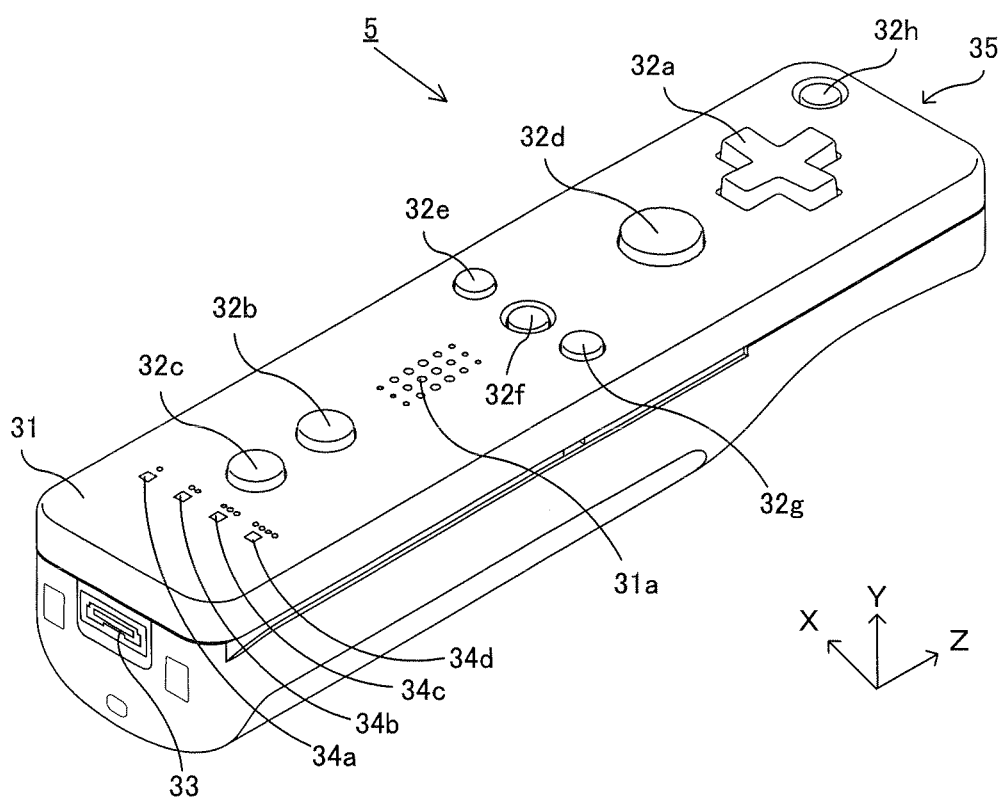
FIG. 4 is a perspective view illustrating the external appearance of a controller 5.
Figure 5:
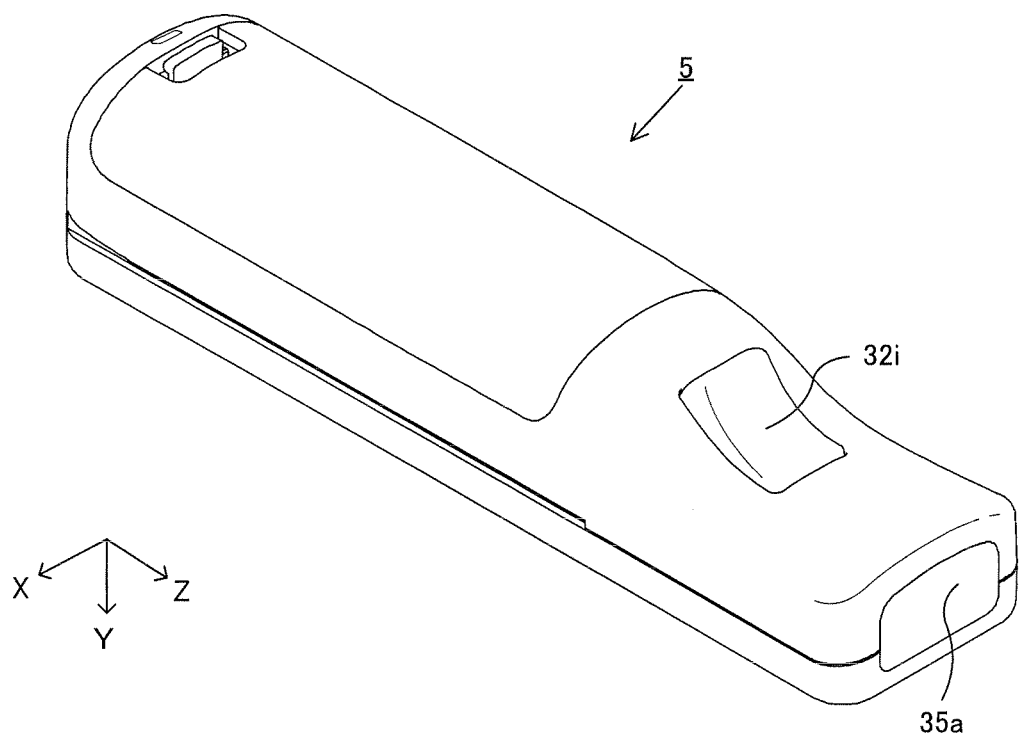
FIG. 5 is another perspective view illustrating the external appearance of the controller 5.

Next, with reference to FIGS. 4 to 7, the controller 5 will be described. FIG. 4 is a perspective view illustrating the external appearance of the controller 5. FIG. 5 is another perspective view illustrating the external appearance of the controller 5. The perspective view of FIG. 4 shows the controller 5 as viewed from the top rear side thereof, and the perspective view of FIG. 5 shows the controller 5 as viewed from the bottom front side thereof.

In FIGS. 4 and 5, the controller 5 has a housing 31 formed by, for example, plastic molding. The housing 31 has a generally parallelepiped shape extending in a longitudinal direction from front to rear (Z-axis direction shown in FIG. 4), and as a whole is sized to be held by one hand of an adult or even a child. The user (player) can perform game operations by pressing buttons provided on the controller 5, and moving the controller 5 to change the position and the orientation thereof.

The housing 31 has a plurality of operation buttons. As shown in FIG. 4, on the top surface of the housing 31, a cross button 32a, a first button 32b, a second button 32c, an A button 32d, a minus button 32e, a home button 32f, a plus button 32g, and a power button 32h are provided. In the present invention, the top surface of the housing 31 on which the buttons 32a to 32h are provided may be referred to as a "button surface". On the other hand, as shown in FIG. 5, a recessed portion is formed on the bottom surface of the housing 31, and a B button 32i is provided on a rear slope surface of the recessed portion. The operation buttons 32a to 32i are assigned, as necessary, their respective functions in accordance with the game program executed by the game apparatus 3. Further, the power button 32h is intended to remotely turn ON/OFF the game apparatus 3. The home button 32f and the power button 32h each have the top surface thereof recessed below the top surface of the housing 31. Therefore, the home button 32f and the power button 32h are prevented from being inadvertently pressed by the player.

On the rear surface of the housing 31, the connector 33 is provided. The connector 33 is used for connecting the controller 5 to another device. Both sides of the connector 33 on the rear surface of the housing 31 have a fastening hole 33a for preventing easy inadvertent disengagement of another device as described above.

In the rear-side portion of the top surface of the housing 31, a plurality (four in FIG. 4) of LEDs 34a, 34b, 34c, and 34d are provided. The controller 5 is assigned a controller type (number) so as to be distinguishable from another main controller. The LEDs 34a, 34b, 34c, and 34d are each used for informing the player of the controller type which is currently being set for the controller 5 being used, and for informing the player of remaining battery power of the controller 5, for example. Specifically, when a game operation is performed using the controller 5, one of the plurality of LEDs 34a, 34b, 34c, and 34d corresponding to the controller type is lit up.

The controller 5 has an imaging information calculation section 35 (FIG. 7), and a light incident surface 35a through which a light is incident on the imaging information calculation section 35 is provided on the front surface of the housing 31, as shown in FIG. 5. The light incident surface 35a is made of a material transmitting therethrough at least infrared light outputted from the markers 6R and 6L.

On the top surface of the housing 31, sound holes 31a for externally outputting a sound from a speaker 49 (shown in FIG. 6) incorporated in the controller 5 is provided between the first button 32b and the home button 32f.

Figure 6:
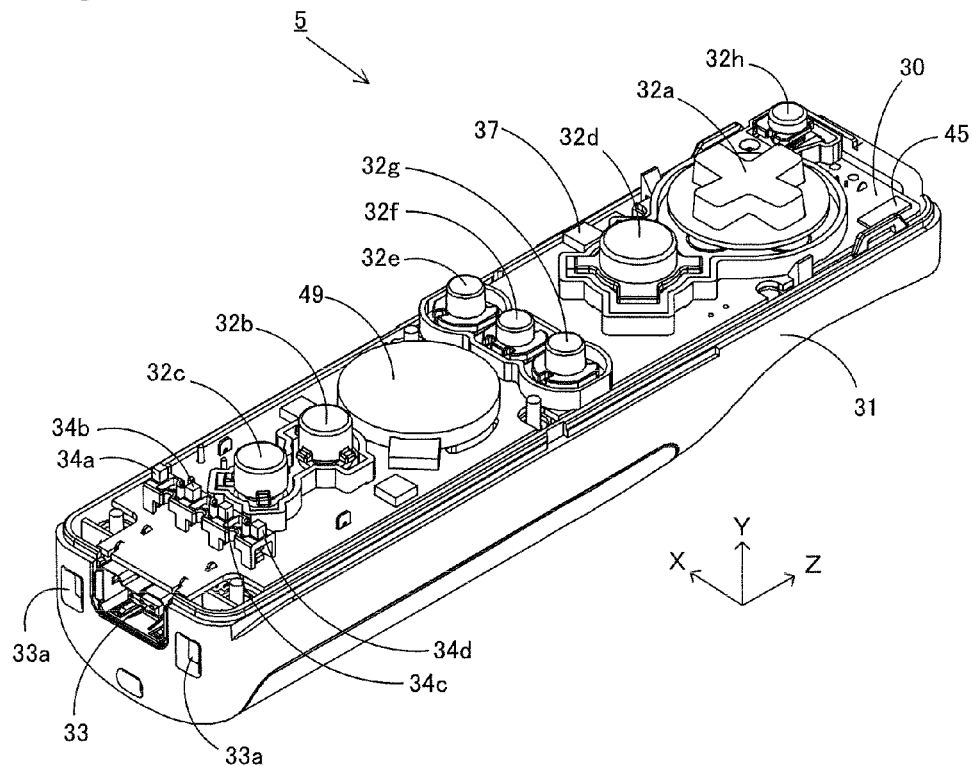
FIG. 6 is a view illustrating an internal structure of the controller 5.
Figure 7:
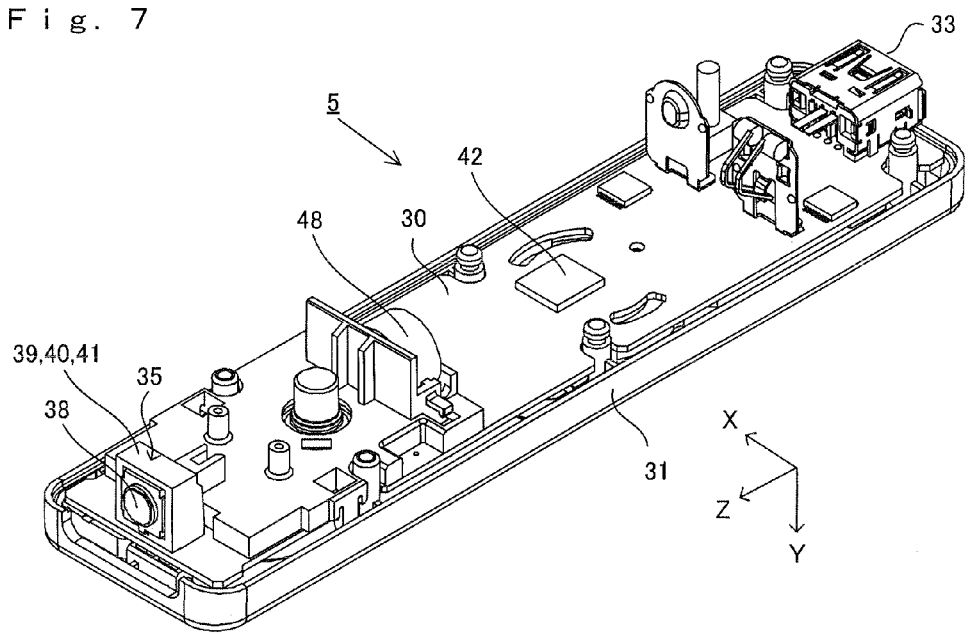
FIG. 7 is another view illustrating an internal structure of the controller 5.

Next, with reference to FIGS. 6 and 7, an internal structure of the controller 5 will be described. FIGS. 6 and 7 are diagrams illustrating the internal structure of the controller 5.

FIG. 6 is a perspective view illustrating a state where an upper casing (a part of the housing 31) of the controller 5 is removed. FIG. 7 is a perspective view illustrating a state where a lower casing (a part of the housing 31) of the controller 5 is removed. The perspective view of FIG. 7 shows a substrate 30 of FIG. 6 as viewed from the reverse side.

As shown in FIG. 6, the substrate 30 is fixed inside the housing 31, and on a top main surface of the substrate 30, the operation buttons 32a to 32h, the LEDs 34a, 34b, 34c, and 34d, an acceleration sensor 37, an antenna 45, the speaker 49, and the like are provided. These elements are connected to a microcomputer 42 (see FIG. 7) via lines (not shown) formed on the substrate 30 and the like. In the present embodiment, the acceleration sensor 37 is provided on a position offset from the center of the controller with respect to the X-axis direction. Thus, calculation of the movement of the controller 5 being rotated around the Z-axis may be facilitated. Further, the acceleration sensor 37 is provided anterior to the center of the controller 5 with respect to the longitudinal direction (Z-axis direction). Further, a wireless module 44 (see FIG. 7) and the antenna 45 allow the controller 5 to act as a wireless controller.

On the other hand, as shown in FIG. 7, at a front edge of a bottom main surface of the substrate 30, the imaging information calculation section 35 is provided. The imaging information calculation section 35 includes an infrared filter 38, a lens 39, an image pickup element 40 and an image processing circuit 41 located in order, respectively, from the front of the controller 5. These components 38 to 41 are attached on the bottom main surface of the substrate 30.

On the bottom main surface of the substrate 30, the microcomputer 42 and a vibrator 48 are provided. The vibrator 48 is, for example, a vibration motor or a solenoid, and is connected to the microcomputer 42 via lines formed on the substrate 30 or the like. The controller 5 is vibrated by actuation of the vibrator 48 based on a command from the microcomputer 42. Therefore, the vibration is conveyed to the player's hand holding the controller 5, and thus a so-called vibration-feedback game is realized. In the present embodiment, the vibrator 48 is disposed slightly toward the front of the housing 31. That is, the vibrator 48 is positioned offset from the center toward the end of the controller 5, and therefore the vibration of the vibrator 48 can lead to enhancement of the vibration of the entire controller 5. Further, the connector 33 is provided at the rear edge of the bottom main surface of the substrate 30. In addition to the components shown in FIGS. 6 and 7, the controller 5 includes a quartz oscillator for generating a reference clock of the microcomputer 42, an amplifier for outputting a sound signal to the speaker 49, and the like.

FIGS. 4 to 7 show only examples of the shape of the controller 5 and the gyroscope unit 7, the shape of each operation button, the number and the positions of acceleration sensors and vibrators, and so on. The present invention can be realized with other shapes, numbers, and positions. Further, although in the present embodiment the imaging direction of the image pickup means is the Z-axis positive direction, the imaging direction may be any direction. That is, the imaging information calculation section 35 (the light incident surface 35a through which a light is incident on the imaging information calculation section 35) of the controller 5 may not necessarily be provided on the front surface of the housing 31, but may be provided on any other surface on which a light can be received from the outside of the housing 31.

Figure 8:
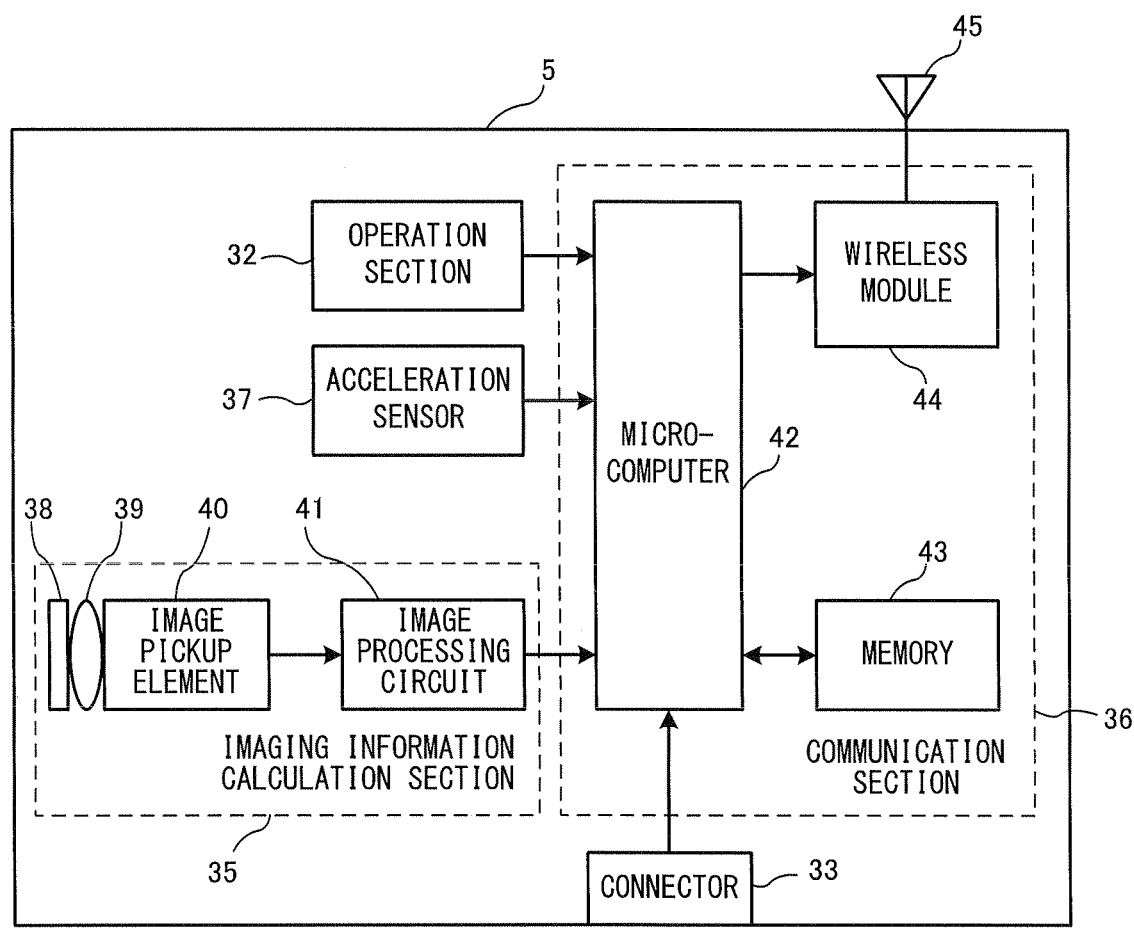
FIG. 8 is a block diagram illustrating the configuration of the controller 5.

FIG. 8 is a block diagram illustrating the configuration of the controller 5. The controller 5 includes an operation section 32 (the operation buttons 32a to 32i), the connector 33, the imaging information calculation section 35, a communication section 36, and the acceleration sensor 37. The controller 5 transmits, as operation data, data representing the content of an operation performed on the controller 5 itself, to the game apparatus 3.

The operation section 32 includes the operation buttons 32a to 32i described above, and outputs, to the microcomputer 42 of the communication section 36, operation button data indicating an input state (that is, whether or not each operation button 32a to 32i is pressed) of each operation button 32a to 32i.

The imaging information calculation section 35 is a system for analyzing image data taken by the image pickup means and calculating, for example, the centroid and the size of an area having a high brightness in the image data. The imaging information calculation section 35 has a maximum sampling period of, for example, about 200 frames/sec., and therefore can trace and analyze even a relatively fast motion of the controller 5.

The imaging information calculation section 35 includes the infrared filter 38, the lens 39, the image pickup element 40 and the image processing circuit 41. The infrared filter 38 transmits therethrough only infrared light included in the light incident on the front surface of the controller 5. The lens 39 collects the infrared light transmitted through the infrared filter 38 so as to be incident on the image pickup element 40. The image pickup element 40 is a solid-state imaging device such as, for example, a CMOS sensor or a CCD sensor, which receives the infrared light collected by the lens 39, and outputs an image signal. The markers 6R and 6L of the marker device 6 provided near the display screen of the television 2 each include an infrared LED for outputting an infrared light forward from the television 2. Therefore, the infrared filter 38 enables the image pickup element 40 to receive only the infrared light transmitted through the infrared filter 38 and generate image data, so that an image of each of the markers 6R and 6L can be taken with enhanced accuracy. Hereinafter, the image taken by the image pickup element 40 is referred to as a pickup image. The image data generated by the image pickup element 40 is processed by the image processing circuit 41. The image processing circuit 41 calculates, in the pickup image, the positions of subjects to be imaged (the marker 6R and the marker 6L). The image processing circuit 41 outputs data representing coordinate points of the calculated positions, to the microcomputer 42 of the communication section 36. The data representing the coordinate points is transmitted as operation data to the game apparatus 3 by the microcomputer 42. Hereinafter, the coordinate points are referred to as "marker coordinate points". The marker coordinate point changes depending on the orientation (angle of tilt) and/or the position of the controller 5 itself, and therefore the game apparatus 3 is allowed to calculate the orientation and the position of the controller 5 using the marker coordinate point.

In another embodiment, the controller 5 may not necessarily include the image processing circuit 41, and the controller 5 may transmit the pickup image as it is to the game apparatus 3. At this time, the game apparatus 3 may have a circuit or a program, having the same function as the image processing circuit 41, for calculating the marker coordinate point.

The acceleration sensor 37 detects accelerations (including a gravitational acceleration) of the controller 5, that is, force (including gravity) applied to the controller 5. The acceleration sensor 37 detects a value of an acceleration (linear acceleration) applied to a detection section of the acceleration sensor 37 in the straight line direction along the sensing axis direction, among all accelerations applied to a detection section of the acceleration sensor 37. For example, a multiaxial acceleration sensor having two or more axes detects an acceleration of a component for each axis, as the acceleration applied to the detection section of the acceleration sensor. For example, the three-axis or two-axis acceleration sensor may be of the type available from Analog Devices, Inc. or STMicroelectronics N.V. The acceleration sensor 37 is, for example, an electrostatic capacitance type acceleration sensor. However, another type of acceleration sensor may be used.

In the present embodiment, the acceleration sensor 37 detects a linear acceleration in each of three axis directions, i.e., the up/down direction (Y-axis direction shown in FIG. 4), the left/right direction (the X-axis direction shown in FIG. 4), and the forward/backward direction (the Z-axis direction shown in FIG. 4), relative to the controller 5. The acceleration sensor 37 detects an acceleration in the straight line direction along each axis, and an output from the acceleration sensor 37 represents a value of the linear acceleration for each of the three axes. In other words, the detected acceleration is represented as a three-dimensional vector (ax, ay, az) in an XYZ-coordinate system (controller coordinate system) defined relative to the controller 5. Hereinafter, a vector representing components of the acceleration values detected for the three axes, respectively, by the acceleration sensor 37 is referred to as an acceleration vector.

Data (acceleration data) representing the acceleration detected by the acceleration sensor 37 is outputted to the communication section 36. The acceleration detected by the acceleration sensor 37 changes depending on the orientation (angle of tilt) and the movement of the controller 5, and therefore the game apparatus 3 is allowed to calculate the orientation and the movement of the controller 5 using the acceleration data. In the present embodiment, the game apparatus 3 determines the orientation (angle of tilt) of the controller 5 based on the acceleration data. That is, the acceleration sensor 37 is used as a sensor for outputting data by which to determine the angle of tilt of the controller 5.

When a computer such as a processor (for example, the CPU 10) of the game apparatus 3 or a processor (for example, the microcomputer 42) of the controller 5 processes an acceleration signal outputted from the acceleration sensor 37, additional information relating to the controller 5 can be inferred or calculated (determined), as one skilled in the art will readily understand from the description herein. For example, in the case where the computer performs processing on the premise that the controller 5 including the acceleration sensor 37 is in static state (that is, in the case where processing is performed on the premise that the acceleration to be detected by the acceleration sensor includes only the gravitational acceleration), when the controller 5 is actually in static state, it is possible to determine whether or not, or how much the controller 5 tilts relative to the direction of gravity, based on the acceleration having been detected. Specifically, when the state where the detection axis of the acceleration sensor 37 faces vertically downward is set as a reference, whether or not the controller 5 tilts relative to the reference can be determined based on whether or not 1 G (gravitational acceleration) is applied to the detection axis, and the degree to which the controller 5 tilts relative to the reference can be determined based on the magnitude of the gravitational acceleration. Further, the multiaxial acceleration sensor 37 processes the acceleration signals having been detected for the respective axes so as to more specifically determine the degree to which the controller 5 tilts relative to the direction of gravity. In this case, the processor may calculate, based on the output from the acceleration sensor 37, the angle at which the controller 5 tilts, or the direction in which the controller 5 tilts without calculating the angle of tilt. Thus, the acceleration sensor 37 is used in combination with the processor, making it possible to determine the angle of tilt or the orientation of the controller 5.

On the other hand, when it is premised that the controller 5 is in dynamic state (where the controller 5 is being moved), the acceleration sensor 37 detects the acceleration based on the movement of the controller 5, in addition to the gravitational acceleration. Therefore, when the gravitational acceleration component is eliminated from the detected acceleration through a predetermined process, it is possible to determine the direction in which the controller 5 moves. Even when it is premised that the controller 5 is in dynamic state, the acceleration component based on the movement of the acceleration sensor is eliminated from the detected acceleration through a predetermined process, whereby it is possible to determine the tilt of the controller 5 relative to the direction of gravity. In another embodiment, the acceleration sensor 37 may include an embedded processor or another type of dedicated processor for performing any desired processing on an acceleration signal detected by the acceleration detection means incorporated therein before outputting to the microcomputer 42. For example, when the acceleration sensor 37 is intended to detect static acceleration (for example, gravitational acceleration), the embedded or dedicated processor could convert the acceleration signal to a corresponding angle of tilt (or another preferable parameter).

Note that in the present embodiment, for example, an electrostatic capacitance-type acceleration sensor is used as the sensor for outputting values fluctuating in accordance with the movement of the controller, but another type of acceleration sensor or a gyroscope may be used. However, it should be noted that the acceleration sensor detects a linear acceleration along each axis, while the gyroscope detects an angular rate for rotation. Specifically, in the case where the gyroscope is employed in place of the acceleration sensor, the nature of signals to be detected is changed, and therefore they cannot be simply replaced with each other. Accordingly, in the case where the gyroscope is used in place of the acceleration sensor to calculate an orientation (angle of tilt), for example, the following changes are made. Specifically, the game apparatus 3 initializes the value of orientation at the start of detection. Then, angular rate data outputted by the gyroscope is integrated. Furthermore, the integration result is used to calculate the amount of orientation change from the initialized orientation value. In this case, the calculated orientation is expressed by an angle.

Note that, as has already been described, in the case where the acceleration sensor is used to calculate the angle of tilt (orientation), the angle of tilt is calculated based on an acceleration vector. Accordingly, the calculated angle of tilt can be expressed by a vector, and therefore the case where the acceleration sensor is used differs from the case where the gyroscope is used in that an absolute direction can be calculated without initialization. Also, the nature of the value calculated as an angle of tilt differs as described above when it is an angle or, a vector, and therefore when the acceleration sensor is replaced with the gyroscope, it is necessary to perform predetermined conversion on data for the angle of tilt.

The communication section 36 includes the microcomputer 42, a memory 43, the wireless module 44 and the antenna 45. The microcomputer 42 controls the wireless module 44 for wirelessly transmitting, to the game apparatus 3, data acquired by the microcomputer 42 while using the memory 43 as a storage area in the process. Further, the microcomputer 42 is connected to the connector 33. Data transmitted from the gyroscope unit 7 is inputted to the microcomputer 42 through the connector 33. Hereinafter, a structure of the gyroscope unit 7 will be described.

Data outputted from the operation section 32, the imaging information calculation section 35, and the acceleration sensor 37 to the microcomputer 42 are temporarily stored to the memory 43. The data are transmitted as the operation data to the game apparatus 3. At the time of the transmission to the wireless controller module 19 of the game apparatus 3, the microcomputer 42 outputs the operation data stored in the memory 43 to the wireless module 44. The wireless module 44 uses, for example, the Bluetooth (registered trademark) technology to modulate the operation data onto a carrier wave of a predetermined frequency, and radiates the low power radio wave signal from the antenna 45. That is, the operation data is modulated onto the low power radio wave signal by the wireless module 44 and transmitted from the controller 5. The wireless controller module 19 of the game apparatus 3 receives the low power radio wave signal. The game apparatus 3 demodulates or decodes the received low power radio wave signal to obtain the operation data. Based on the obtained operation data and the game program, the CPU 10 of the game apparatus 3 performs the game process.

The wireless transmission from the communication section 36 to the wireless controller module 19 is sequentially performed at a predetermined time interval. Since the game process is generally performed at a cycle of 1/60 sec. (corresponding to one frame time), data is preferably transmitted at a cycle of a shorter time period. The communication section 36 of the controller 5 outputs, to the wireless controller module 19 of the game apparatus 3, the respective operation data at intervals of 1/200 seconds, for example.

The controller 5 makes it possible for the player to perform an operation of tilting the controller 5 at an arbitrary angle of tilt in addition to conventional and general game operations of pressing the operation buttons. By the controller 5, the player can also perform other operations, which include pointing at an arbitrary position on the screen with the controller 5 and moving the controller 5 itself.

[Configuration of the Illumination Device 9]

Figure 9:
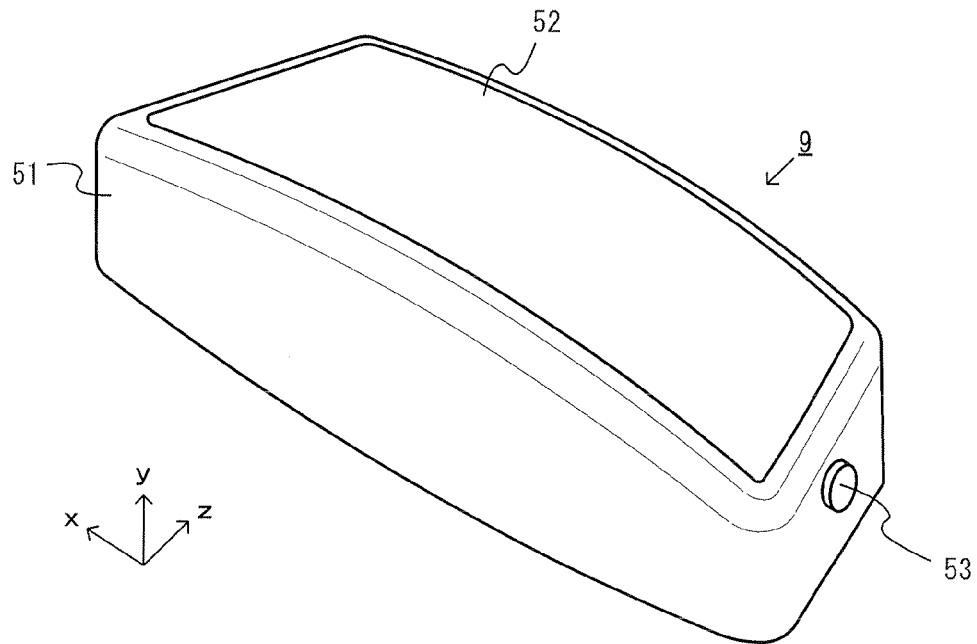
FIG. 9 is an external view of an illumination device 9.
Figure 10:
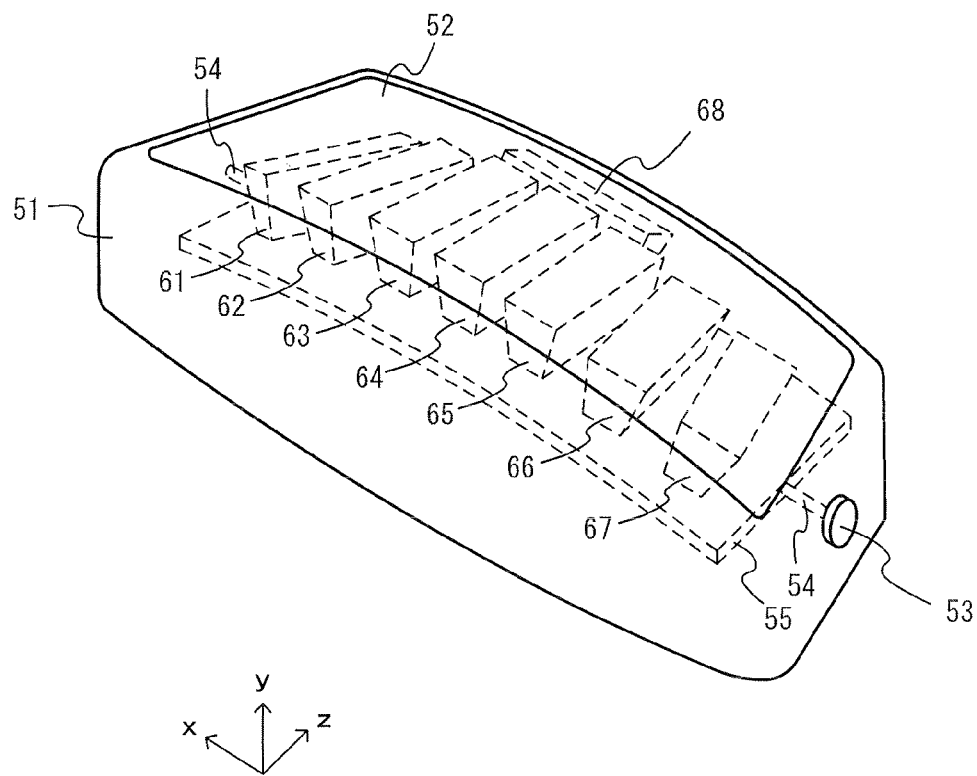
FIG. 10 is a perspective view illustrating main features inside the illumination device 9.

Next, referring to FIGS. 9 to 15, the configuration of the illumination device 9 will be described. FIG. 9 is an external view of the illumination device 9. Also, FIG. 10 is a perspective view illustrating main features inside the illumination device 9. In FIG. 9, the illumination device 9 includes a housing 51, a cover 52, a shaft head portion 53, a support shaft 54, a support 55, and eight light modules 61 to 68. The illumination device 9 is intended to emit visible light, which is shed on the wall behind the television 2, thereby providing additional visual effects to the user along with images displayed on the television 2.

As shown in FIG. 9, the housing 51 has an opening in its top surface (the surface on the y-axis positive direction side shown in FIG. 9), and the housing 51 has installed therein the support shaft 54, the support 55, and the eight light modules 61 to 68. The eight light modules 61 to 68 (the light modules shown in FIG. 3) are attached on the support 55. As will be described in detail later, the light modules 61 to 68 are visible light-emitting components. Also, the opening above the support 55 and the light modules 61 to 68 has the transparent cover 52 attached thereto. Accordingly, light emitted from the light modules 61 to 68 is transmitted through the cover 52 to the outside of the housing 51. Note that in another embodiment, the illumination device 9 may have no cover 52 such that the emission surfaces of the light modules 61 to 68 are exposed to the outside.

Also, as shown in FIG. 10, the support 55 is connected at its opposite ends (ends in the x-axis direction shown in FIG. 10) to the support shaft 54. The support shaft 54 is inserted in holes provided in the side surfaces of the housing 51. As a result, the support 55 is rotatably supported (about the x-axis) by the housing 51. Also, the support shaft 54 is connected to the shaft head portions 53 outside the housing 51. Accordingly, the user can rotate the shaft head portions 53, thereby rotating the support 55 (changing its inclination). In this manner, the illumination device 9 has a tilt mechanism including the support 55 and the support shaft 54, and therefore the user can change the inclination of the support 55, thereby changing the emitting direction of the light modules 61 to 68.

Next, the internal structure of the light modules will be described. Among the eight light modules 61 to 68, seven of them, 61 to 67, are arranged in almost the same direction (i.e., not exactly in the same direction), and emit light ("linear light" to be described later) having an elongated (linear) cross section. The seven light modules 61 to 67 have the same structure. On the other hand, the light module 68 emits light ("background light" to be described later) having a wider cross section than the light modules 61 to 67. In the following descriptions, to distinguish the light modules 61 to 67 and the light module 68, the former may be referred to as a "linear light module", while the latter may be referred to as a "background light module".

Figure 11:
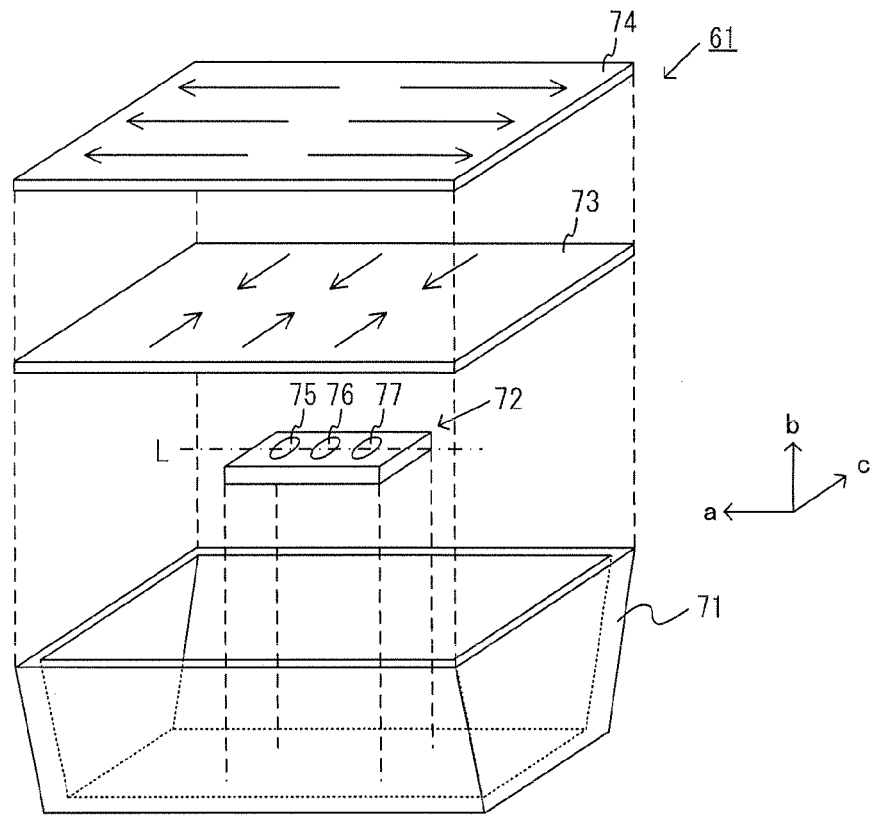
FIG. 11 is a diagram illustrating an internal structure of a linear light module.

FIG. 11 is a diagram illustrating the internal structure of the linear light module. In FIG. 11, the linear light module 61 includes a housing 71, a color LED module 72, a condensing lens 73, and a diffusion sheet 74. While FIG. 11 shows the internal structure of the linear light module 61, the other linear light modules 62 to 67 have the same internal structures as that shown in FIG. 11.

As shown in FIG. 11, the housing 71 has a box-like shape with an open top surface. In the housing 71, the color LED module 72 is attached to a base plate (bottom). The color LED module 72 is capable of emitting light of a plurality of colors. In the present embodiment, the color LED module 72 includes a red LED 75, a green LED 76 and a blue LED 77, and can emit light of a desired color by the microcomputer 28 (FIG. 2) suitably adjusting the intensity of light emitted from each of the LEDs 75 to 77 (e.g., each at 256 levels). The three LEDs 75 to 77 are arranged in line (in FIG. 11, a line is formed along axis L parallel to the a-axis direction).

The condensing lens 73 is provided above the color LED module 72. In FIG. 11, the condensing lens 73 is attached to the opening of the housing 71. In the present embodiment, the condensing lens 73 converges light only in one direction. In the present embodiment, the converging direction of the condensing lens 73 (the direction in which the lens has a curvature) is the c-axis direction shown in FIG. 11 (see the arrow shown in FIG. 11). Also, in the present embodiment, to reduce the size of the light module 61, a Fresnel lens (linear Fresnel lens) is used as the condensing lens 73. In another embodiment, in place of the linear Fresnel lens, a convex cylindrical lens may be used as the condensing lens 73.

The diffusion sheet 74 is attached above the condensing lens 73. The diffusion sheet 74 diffuses light only in a direction perpendicular to the converging direction of the condensing lens 73, i.e., in the a-axis direction. Note that in another embodiment, in place of the diffusion sheet 74, a concave cylindrical lens may be used.

Figure 12:
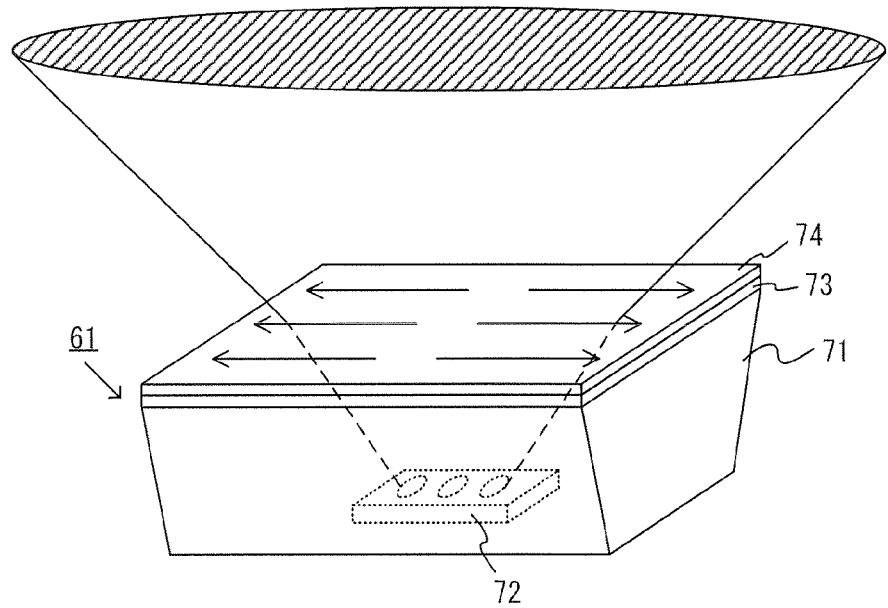
FIG. 12 is a diagram illustrating light emitted from the linear light module.

FIG. 12 is a diagram illustrating light emitted from the linear light module. As shown in FIG. 11, light from the color LED module 72 is condensed in the c-axis direction by the condensing lens 73 and also diffused in the a-axis direction by the diffusion sheet 74. As a result, light emitted from the linear light module has an elongated (linear) cross section which is wide in the a-axis direction and narrow in the c-axis direction, as shown in FIG. 12. Here, the "cross section of light" refers to the shape of light being shed on a surface perpendicular to the travel direction of the light. Hereinafter, light having an elongated (linear) cross section is referred to as "linear light".

Figure 13:
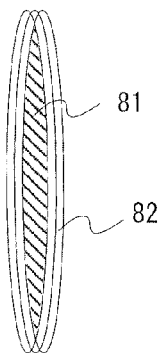
FIG. 13 is a diagram illustrating exemplary linear light being shed when three LEDs 75 to 77 are misaligned with respect to axis L.

Also, in the present embodiment, the converging direction (the arrow shown in FIG. 11) of the condensing lens 73 is perpendicular to the direction in which the three LEDs 75 to 77 are arranged (the direction of axis L shown in FIG. 11) Specifically, the three LEDs 75 to 77 are arranged side by side along axis L parallel to the a-axis direction, while the condensing lens 73 is disposed such that the converging direction coincides with the c-axis direction perpendicular to the a-axis direction. The reason for this is to mix three colors of light from the three LEDs 75 to 77 without displacement, thereby clearly shedding linear light on the wall surface (so that the light appears as a single color). Here, if the three LEDs 75 to 77 are misaligned with respect to axis L, light emitted from each of the LEDs 75 to 77 and transmitted through the condensing lens 73 is displaced with respect to the c-axis direction. FIG. 13 is a diagram illustrating exemplary linear light being shed when the three LEDs 75 to 77 are misaligned with respect to axis L. In this case, three rays of light from the LEDs 75 to 77 are shed on the wall surface while being displaced with respect to the c-axis direction, so that the three colors of light are mixed at the center 81 but they are not mixed at the periphery 82 of the linear light as shown in FIG. 13. On the other hand, in the present embodiment, the LEDs 75 to 77 are arranged in a direction perpendicular to the converging direction of the condensing lens 73, so that rays of light being shed coincide at their peripheries, making it possible to make the shed light appear clear.

Note that in the present embodiment, the condensing lens 73 and the diffusion sheet 74 are used to shed linear light on the wall surface. Here, in another embodiment, linear light may be created by any method. For example, linear light may be created using only the condensing lens 73 without using the diffusion sheet 74 or may be created using slits in place of the condensing lens 73 and the diffusion sheet 74. Alternatively, the linear light modules 61 to 67 may shed laser light in place of LED light, thereby realizing linear light.

Also, the background light module 68 emits light (background light) having a broader cross section than the light emitted by the linear light modules 61 to 67. In the present embodiment, the background light module 68 includes the housing and the color LED module units but includes neither the condensing lens nor the diffusion sheet. While the background light module 68 has three color (red, green and blue) LEDs as the color LED module units, these LEDs emit light with a higher intensity at a wider angle when compared to the LEDs used in the linear light modules 61 to 67. In the present embodiment, the background light module 68 emits light with a lower intensity than the light from the linear light modules 61 to 67, thereby rendering the linear light more conspicuous than the background light. Conversely, by increasing the light intensity of the background light module 68 higher than the light intensity of the linear light modules 61 to 67, the background light can be more conspicuous than the linear light. Also, only one of the background light and the linear light may be shed. Note that in another embodiment, the background light module 68 may use a condensing lens as in the linear light modules 61 to 67 or may use a condensing lens and a diffusion sheet. In the case where a condensing lens is used, the converging direction is the same as in the linear light modules 61 to 67. Also, the diffusion sheet to be used diffuses light in both the vertical and horizontal directions.

Figure 14:
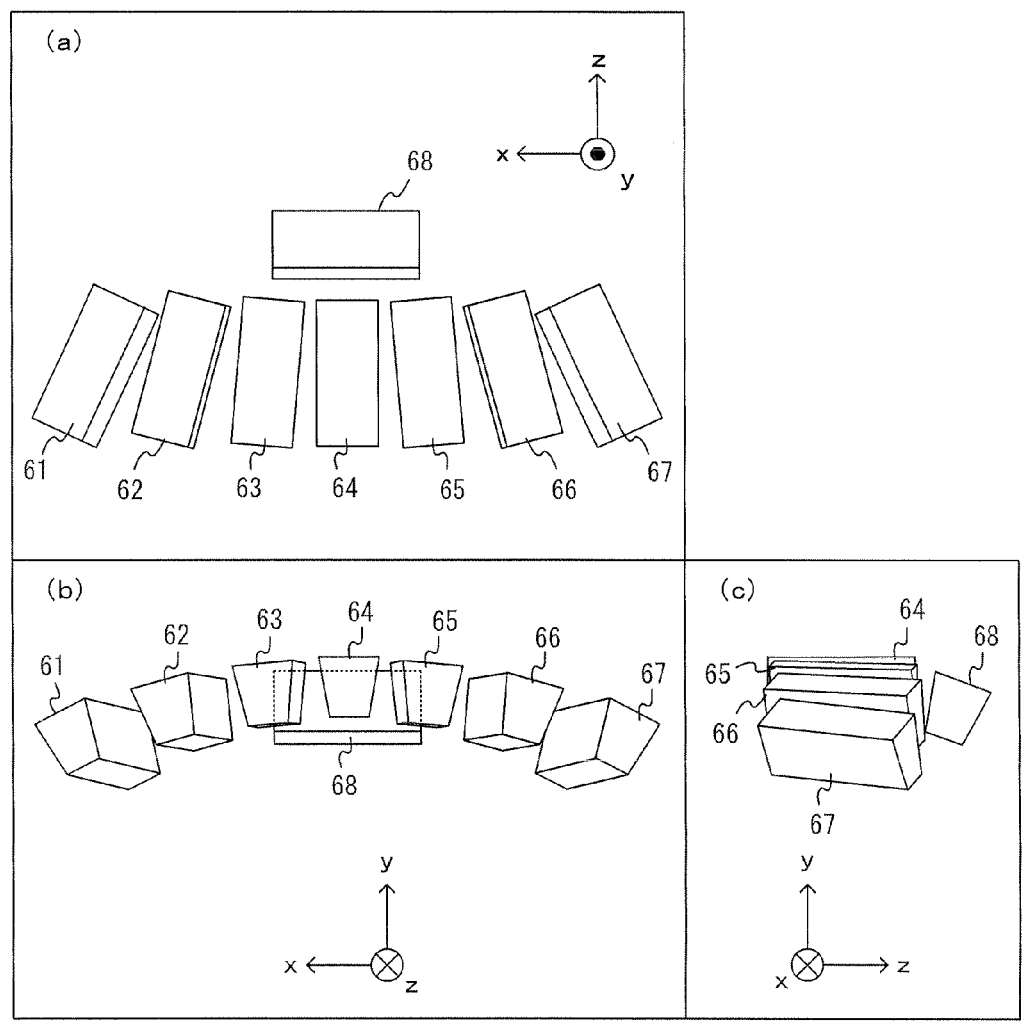
FIG. 14 provides three views illustrating the arrangement of light modules.

Next, the arrangement of the light modules 61 to 68 in the illumination device 9 will be described with reference to FIG. 14. FIG. 14 provides three views illustrating the arrangement of the light modules. In FIG. 14, view (a) illustrates the light modules 61 to 68 as viewed from the y-axis positive direction (from above), view (b) illustrates the light modules 61 to 68 as viewed from the z-axis negative direction (from front), and view (c) illustrates the light modules 61 to 68 as viewed from the x-axis negative direction. While FIG. 14 shows the emitting direction of the light module 64 as being vertically upward for easy understanding of the descriptions, the light modules 61 to 68 are in reality disposed at a tilt such that the illumination device 9 emits light from the back obliquely upward.

The linear light modules 61 to 68 emit linear light obliquely upward from the rear of the illumination device 9, such that the light radiates from around the illumination device 9. Specifically, as shown in views (a) and (b) of FIG. 14, the linear light modules 61 to 67 are arranged side by side in the x-axis direction (right-left direction) so as to be symmetrical with respect to yz-plane and radial from the linear light module 64. Also, the linear light modules 61 to 67 are arranged with the longitudinal directions of their emission surfaces (the longitudinal directions of rays of linear light) being approximately radial from a predetermined position behind the illumination device 9, as viewed from above (in the y-axis positive direction) as in view (a) of FIG. 14. Specifically, the linear light modules 61 to 67 are arranged with the rears (the ends in the z-axis positive direction) of the outermost modules being directed most obliquely to the inside, as viewed from above. Furthermore, the linear light modules 61 to 67 are arranged with their emitting directions being approximately radial from a predetermined position below the illumination device 9, as viewed from front as in view (b) of FIG. 14. Specifically, the linear light modules 61 to 67 are arranged with the emitting directions of the outermost modules being directed most obliquely to the outside, as viewed from above.

Also, the background light module 68 emits background light in such a direction so as to overlap with linear light emitted from the linear light modules 61 to 67. Specifically, as shown in view (a) of FIG. 14, the background light module 68 is located approximately at the center among the linear light modules 61 to 67 in the x-axis direction (right-left direction). Also, the background light module 68 is located behind the linear light modules 61 to 67 in the z-axis direction (front-back direction). Furthermore, as in view (c) of FIG. 14, the background light module 68 is disposed with its emitting direction tilted slightly downward compared to the linear light module 64. In another embodiment, the background light module 68 may have the emitting direction pointing upward compared to the linear light module 64 or the same emitting direction as the linear light module 64.

Figure 15:
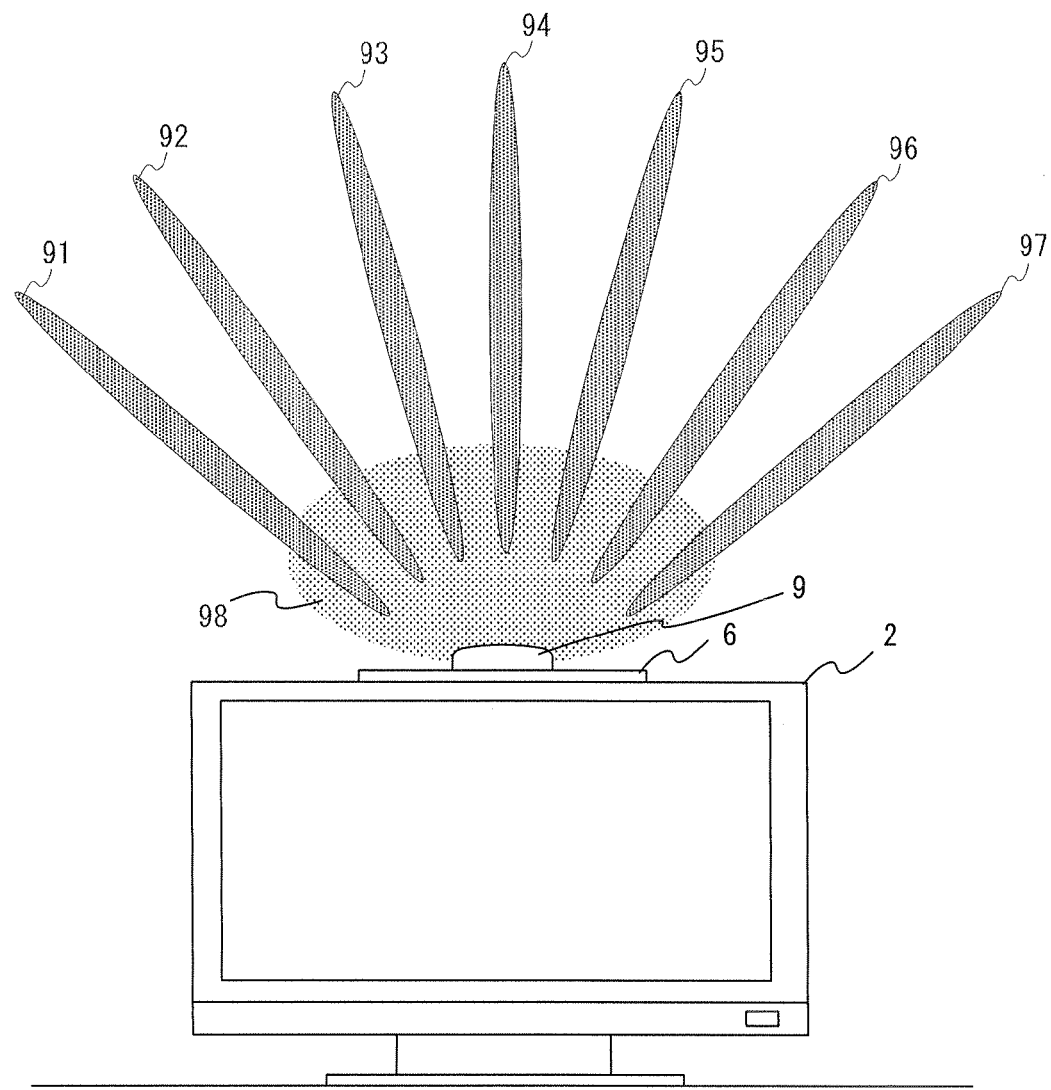
FIG. 15 is a diagram illustrating linear light and background light shed on a surface behind a television 2 by the illumination device 9.

FIG. 15 is a diagram illustrating linear light and background light shed on a surface behind the television 2 by the illumination device 9. In FIG. 15, a region 91 has light from the linear light module 61 shed thereon, a region 92 has light from the linear light module 62 shed thereon, a region 93 has light from the linear light module 63 shed thereon, a region 94 has light from the linear light module 64 shed thereon, a region 95 has light from the linear light module 65 shed thereon, a region 96 has light from the linear light module 66 shed thereon, a region 97 has light from the linear light module 67 shed thereon, and a region 98 has light from the background light module 68 shed thereon. As shown in FIG. 15, in the present embodiment, light is shed on a surface behind the television 2, thereby providing an effective illumination effect (decorative effect) to the display screen such that the display screen as viewed from the front of the television 2 appears as if its surroundings were decorated with light. Also, if the illumination device 9 emits light to the user (i.e., forward), the user only perceives the illumination device 9 as merely lighting up at one point, which is marginal as a decorative effect on the display screen. On the other hand, in the present embodiment, the illumination device 9 emits light rearward so that the light is shed on a wall surface, thereby causing the user to see the light on the wall surface. Therefore, it is possible to achieve a significant decorative effect of allowing the user to see light in a wider range than the display screen of the television 2.

By arranging the linear light modules 61 to 67 as shown in FIG. 14, linear light can be shed obliquely upward from the back of the illumination device 9 so as to be approximately radial from the illumination device 9, as shown in FIG. 15. In the present embodiment, the illumination device 9 sheds a plurality of rays of linear light, and therefore when compared to the case where only one ray of light is shed, lighting patterns can be increased, resulting in wider variations of illumination effect.

In general, it is conceivable that the wall behind the television 2 has a flat surface or even an irregular surface, e.g., a reentrant surface (typically, in the case where the television 2 is positioned in a corner of a room) or a curtain behind the television 2. If the wall surface has such irregularities, shed light might be distorted due to the irregularities. For example, when horizontally elongated light (having a horizontally long cross section) is shed on an irregular wall surface, the shed light does not appear as a single line. Also, for example, when a plurality of rays of light are emitted side by side in the horizontal direction, if the rays of light are shed on an irregular surface, they become horizontally misaligned. On the other hand, in the present embodiment, the illumination device 9 radially sheds a plurality of rays of linear light, and therefore it is possible to shed linear light with less conspicuous distortion caused by the light being shed on an irregular surface behind the television 2, so that linear light can be similarly shed radially on walls of different surface conditions. For example, in the case where a plurality of rays of linear light are emitted to a room corner, the rays of light are shed straight although the angle of radiation differs from the case where the rays of light are emitted onto a plane, so that the shed light has little unnaturalness in appearance. Also, in general, most surfaces of curtains or suchlike are horizontally irregular and have less irregularities in the vertical direction, and therefore linear light can be similarly shed so as to appear almost as linear as it should be.

Also, in the present embodiment, by disposing the background light module 68 as shown in FIG. 14, the linear light and the background light can be shed so as to overlap with each other on the wall surface, as shown in FIG. 15. Accordingly, the illumination device 9 can control the color not only of the linear light but also of the background, and therefore when compared to the case where only the linear light is controlled, lighting patterns can be increased, resulting in wider variations of illumination effect. Also, in the present embodiment, the light intensity of the background light module 68 is set lower than the light intensity of the linear light modules 61 to 67, and therefore any regions on which both the background light and the linear light are shed appear as the color of the linear light. That is, the linear light appears on the wall surface as if it were shed overlapping on the background light.

Note that the arrangement of the light modules 61 to 68 shown in FIG. 14 is merely illustrative, and the linear light modules 61 to 67 may be arranged in any manner so long as the linear light is shed on the wall surface behind the television 2 so as to be approximately radial from the illumination device 9. Also, in another embodiment, for example, the linear light modules 61 to 67 may be arranged such that rays of linear light are parallel to one another or represent a predetermined shape. On the other hand, the background light module 68 may be disposed in any manner so long as light is emitted therefrom in such a direction so as to overlap with light from the linear light modules 61 to 67. Also, in another embodiment, the background light module 68 may be disposed such that light is emitted therefrom in such a direction so as to overlap with light from some of the linear light modules 61 to 67.

[Process by the Game Apparatus 3 for Controlling the Illumination Device 9]

Next, processes performed by the game apparatus 3 will be described mainly focusing on a process for controlling the illumination device 9. In the present embodiment, when the game apparatus 3 performs a game process in accordance with a game program stored on the optical disc 4, a game image is displayed on the television 2 and the illumination device 9 is used to provide additional illumination effects. Hereinafter, control of the illumination device 9 when performing a game process will be described.

Figure 16:
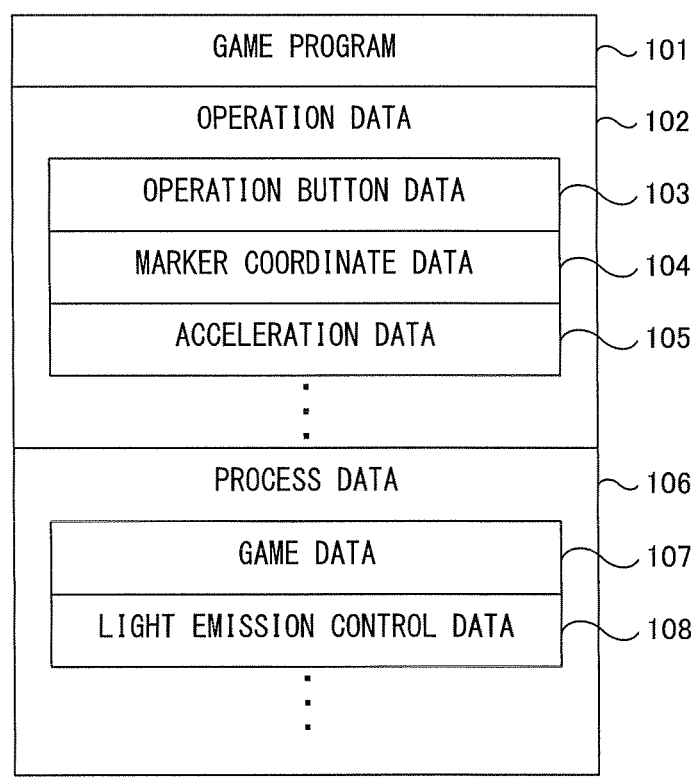
FIG. 16 is a diagram illustrating main data to be stored in a main memory of the game apparatus 3.

First, main data used in the process performed by the game apparatus 3 will be described with reference to FIG. 16. FIG. 16 is a diagram illustrating main data to be stored in the main memory (the external main memory 12 or the internal main memory 11e) of the game apparatus 3. As shown in FIG. 16, a game program 101, operation data 102, and process data 106 are stored in the main memory of the game apparatus 3. In addition to the data shown in FIG. 16, data necessary for the game process, such as image data of various objects appearing in a game, data representing various parameters of the objects, and the like, are stored in the main memory.

Part or all of the game program 101 is read from the optical disc 4 and stored to the main memory at an appropriate time after the game apparatus 3 is brought into the aforementioned normal mode. The game program 101 includes a program for performing a game process and a program for controlling light emission of the illumination device 9 in accordance with the game process (step S5 to be described later).

The operation data 102 is operation data transmitted from the controller 5 to the game apparatus 3. As described above, the operation data is transmitted from the controller 5 to the game apparatus 3 at intervals of 1/200 seconds, and therefore the operation data 102 stored in the main memory is updated at the same intervals. The operation data 102 contains operation button data 103, marker coordinate data 104, and acceleration data 105.

The operation button data 103 is data representing an input state of each of the operation buttons 32a to 32i. Specifically, the operation button data 103 indicates whether or not the operation buttons 32a to 32i are being pressed.

The marker coordinate data 104 represents a coordinate point calculated by the image processing circuit 41 of the imaging information calculation section 35, that is, the data represents the marker coordinate point. The marker coordinate point is expressed by a two-dimensional coordinate system for representing a position corresponding to a pickup image in a plane. When an image including two markers 6R and 6L (infrared light) is taken by the image pickup element 40, two marker coordinate points are calculated. On the other hand, when either the marker 6R or the marker 6L is not positioned within a range in which the image pickup element 40 is allowed to take an image, the image pickup element 40 takes an image including only one marker, and only one marker coordinate point is calculated. Further, when neither the marker 6R nor the marker 6L is positioned within the range in which the image pickup element 40 is allowed to take an image, the image pickup element 40 does not take any image of the markers, so that no marker coordinate point is calculated. Therefore, the marker coordinate data 104 may represent two marker coordinate points, one marker coordinate point, or no marker coordinate point.

The acceleration data 105 is data representing an acceleration (acceleration vector) detected by the acceleration sensor 37. Here, the acceleration data 105 represents a three-dimensional acceleration vector whose components are accelerations associated with the directions of three axes, that is, the X-axis, the Y-axis, and the Z-axis shown in FIG. 4.

The process data 106 is data used for a game process (FIG. 17) described below. The process data 106 contains game data 107 and light emission control data 108. The game data 107 is data for game parameters having effect on control of the illumination device 9. For example, the game data 107 may be data representing parameters for characters appearing in a game or data indicating the position of a cursor displayed on the screen.

The light emission control data 108 is data for controlling light emission from the illumination device 9. In the present embodiment, the light emission control data 108 indicates the color and intensity of light to be emitted by each light module 29 of the illumination device 9. Specifically, for example, emission intensities of the red, green and blue LEDs are represented by 256 levels. As will be described in detail later, the light emission control data 108 is transmitted to the illumination device 9 and acquired by the microcomputer 28, which controls the light modules 29 in accordance with the light emission control data 108.

Figure 17:
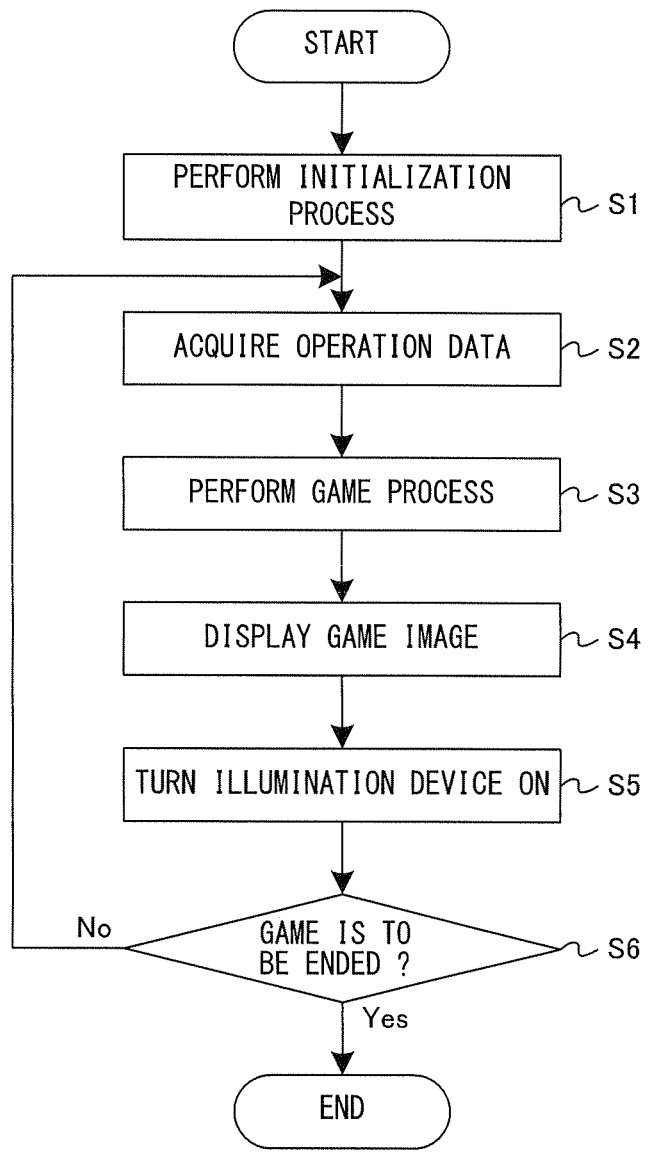
FIG. 17 is a flow chart showing a flow of the process performed by the game apparatus 3.

Next, the process performed by the game apparatus 3 will be described in detail with reference to FIG. 17. FIG. 17 is a flow chart showing a flow of the process performed by the game apparatus 3. In the normal mode, when the user inputs an instruction to start the game to the game apparatus 3, the CPU 10 of the game apparatus 3 executes a boot program stored in an unillustrated boot ROM, so as to initialize each unit, including the main memory. Then, the game program stored in the optical disc 4 is loaded to the main memory, and the CPU 10 starts executing the game program. The flow chart of FIG. 17 illustrates a process performed when the processes described above are completed.

First, in step S1, the CPU 10 performs an initialization process for the game. In the initialization process, values of various parameters to be used in the game process are initialized, a virtual game space is established, and a player object and other objects are arranged in initial positions within the game space. Following step S1, a process loop of steps S2 to S6 will be repeatedly performed while the game is executed. Note that the process loop is executed once every frame period (e.g., 1/60 sec.).

In step S2, the CPU 10 acquires operation data. Specifically, operation data transmitted from the controller 5 is received via the wireless controller module 19. Then, operation button data, marker coordinate data and acceleration data contained in the received operation data are stored to the main memory. Following step S2, the process of step S3 is performed.

In step S3, the CPU 10 executes a game process based on the operation data acquired in step S2. Specifically, for example, the process is executed to control action of a game character based on the operation data or calculate a position of a cursor displayed on the screen based on the operation data (in particular, for example, marker coordinate data 104). At this time, game data 107 resulting from the game process is stored to the main memory. Following step S3, the process of step S4 is performed.

In step S4, the CPU 10 displays a game image on the screen of the television 2 in accordance with the game process executed in step S3. Specifically, the CPU 10 (and the GPU 11b) reads the game data 107 from the main memory, and then generates and displays the game image on the screen based on the game data 107 and other data. For example, the game image may be an image of the game space including the game character or having a cursor image superimposed thereon. Also, in step S4, the CPU 10 (and the DSP 11c) generates a game sound based on the game data 107 and other data in accordance with the game process, and outputs the generated sound through the speaker 2a. Note that the game sound may be, for example, background music in the game, sound effect in the game, or the voice of the game character. Following step S4, the process of step S5 is performed.

In step S5, the CPU 10 controls light emission by the illumination device 9. Specifically, the CPU 10 reads the game data 107 from the main memory, and generates light emission control data 108, which indicates the color and the intensity of light to be emitted by each light module 29, based on the game data 107. The generated light emission control data 108 is stored to the main memory, and the input/output processor 11a transmits the data to the illumination device 9 via the extension connector 20. Upon receipt of the light emission control data 108, the microcomputer 28 of the illumination device 9 controls light emission of each light module 29 in accordance with the light emission control data 108. Note that in the present embodiment, the light emission control data 108 is transmitted to the illumination device 9 at the same time intervals as updating of the game image (1/60 sec.), although it can be transmitted at any time intervals. In this manner, the light emission control data 108 is repeatedly transmitted, so that the game apparatus 3 can change lighting by the illumination device 9, thereby providing illumination effects to the user in accordance with, for example, game conditions, game image, game sound, and game operation. Following step S5, the process of step S6 is performed.

In step S5, the CPU 10 determines the state of light emission by the illumination device 9 in accordance with the game process of step S3. For example, the state of light emission by the illumination device 9 is determined based on game conditions, game image, game sound, and game operation. Specific examples of control of the illumination device 9 include the following:

(1) Exemplary Control in Accordance with a Game Image (Game Conditions)

The CPU 10 changes the state of light emission by the illumination device 9 (e.g., light intensity, color, and light emission pattern) in accordance with a change of the game image (game conditions) on the screen. For example, in a fighting game, the state of light emission by the illumination device 9 may be changed in response to a character's attack successfully landing on another character, or in a shooting game, the state of light emission by the illumination device 9 may be changed in response to a bullet hitting a target. In this manner, an illumination effect can be effectively added to a game image by producing the illumination effect in accordance with a change of the game image.

(2) Exemplary Control in Accordance with a Game Operation

The CPU 10 changes the state of light emission by the illumination device 9 in accordance with the user's game operation. Specifically, the CPU 10 may cause the light modules 61 to 68 to emit light or change the color of light in response to the user pressing an operation button of the controller 5.

Also, in the case where the position of a cursor on the screen is controlled in accordance with an operation on the controller 5, the CPU 10 may change the state of light emission by each of the light modules 61 to 68 in accordance with the cursor position on the screen. For example, each of the linear light modules 61 to 67 may correspond to one of seven sections into which the screen is horizontally divided, such that only the linear light module corresponding to a region including the cursor position emits light.

(3) Exemplary Control in Accordance with Game Sound

The CPU 10 changes the state of light emission by the illumination device 9 in accordance with music, such as background music, in the game. Specifically, the light modules 61 to 68 blink to the rhythm of the music or change light emission pattern and/or colors to the tone (pitch) of outputted sound. Also, in a music game where music is played in accordance with the user's game operation, the illumination device 9 may be controlled in accordance with the music played. As a result, the user can enjoy the music, which is being played through his/her operations, not only aurally but also visually.

In step S6, the CPU 10 determines whether or not to end the game. The determination of step S6 is made based on, for example, whether or not the game has been cleared, whether or not the game is over, or whether or not the player has given an instruction to stop the game. When the determination result of step S6 is negative, the process of step S2 is performed again. Thereafter, until the game is determined to be ended in step S6, a process loop of steps S2 to S6 is repeatedly performed. On the other hand, when the determination result of step S6 is affirmative, the CPU 10 ends the game process shown in FIG. 17. This is the end of the description of the game process.

As described above, according to the present embodiment, the television 2 displays the game image and the illumination device 9 sheds light on the wall surface behind the television 2 to provide additional illumination effects. As a result, additional visual effects can be provided to the user along with game images, allowing the game to offer more realistic and impressive effects.

Other Embodiments

The above embodiment is an example of carrying out the present technology, and in other embodiments, the present technology can be carried out in the following manners, for example.

(Variant in which the Illumination Device 9 is Driven in Accordance with Images Other than the Game Image)

While the above embodiment has been described with respect to the case where the illumination device 9 produces an additional illumination effect when the game image is displayed on the screen of the television 2, the image to be displayed on the screen of the television 2 is not limited to the game image, and moving and still images other than the game image may be displayed. For example, the game apparatus 3 may externally acquire an image from another game apparatus or a server via a network, and the illumination device 9 may produce an additional illumination effect when the television 2 displays the image. In this case, the game apparatus 3 may acquire data (the aforementioned light emission control data 108) for controlling light emission by the illumination device 9 along with the image or from a different device or server from the source of the image. Also, the game apparatus 3 may automatically create light emission control data from the acquired image in accordance with a predetermined algorithm.

(Variant in which the Illumination Device 9 Emits Light for a User Notification)

Also, the illumination device 9 may be used for the purpose of providing a user notification in addition to the purpose of providing an additional visual effect to the image displayed on the television 2. In the present embodiment, the game apparatus 3 can operate in the aforementioned sleep mode. In the sleep mode, the CPU 10 does not operate, so that neither the game process is performed nor the game image is displayed, but the input/output processor 11*a* communicates with an external device (e.g., another game apparatus or a server device) via a network. For example, in the sleep mode, the game apparatus 3 transmits/retrieves a message (in e-mail format) created by the user to/from another game apparatus or retrieves a game program or video data from a server device. In the present variant, when the game apparatus 3 in the sleep mode receives a message from another game apparatus, the illumination device 9 emits light to provide a receipt notification. A detailed description thereof will be provided below.

Figure 18:
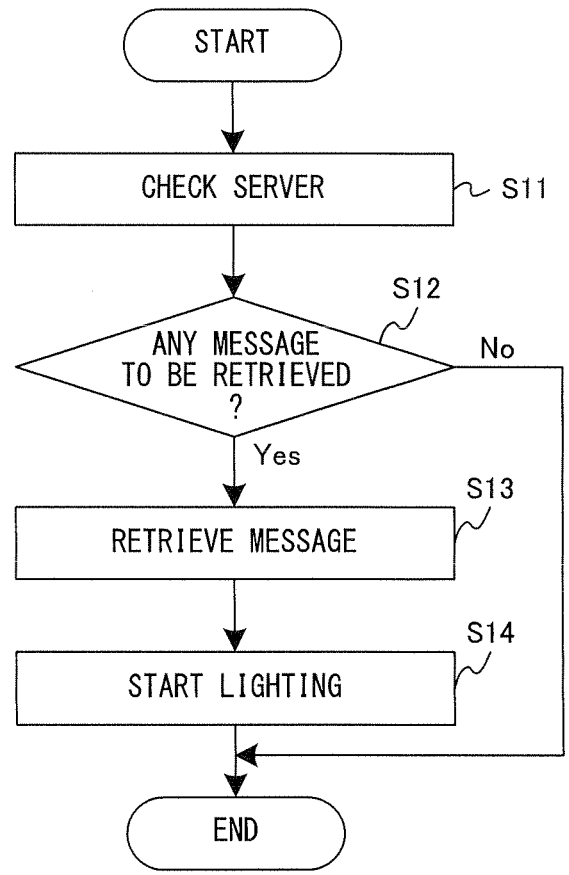
FIG. 18 is a flowchart illustrating a data reception process by an input/output processor 11a during a sleep mode.

FIG. 18 is a flowchart illustrating a data reception process by the input/output processor 11*a* during the sleep mode. In the sleep mode, the input/output processor 11*a* performs the process shown in FIG. 18 at predetermined times (e.g., once every predetermined time period). While FIG. 18 shows the process during the sleep mode, the input/output processor 11*a* also communicates with external devices during the normal mode.

In step S11, the input/output processor 11*a* accesses a mail server which stores and manages messages, and confirms whether or nor there is any message directed to the game apparatus 3. Subsequently, in step S12, the input/output processor 11*a* determines whether or not there is any message to be retrieved based on the confirmation result of step S11. When there is any message to be retrieved, the process of step S13 is performed. On the other hand, when there is no message to be retrieved, the input/output processor 11*a* ends the data reception process shown in FIG. 18.

In step S13, the input/output processor 11*a* retrieves a message from the mail server. Specifically, the input/output processor 11*a* accesses the mail server to retrieve a message and then stores the message to the flash memory 17. Following step S13, the process of step S14 is performed.

In step S14, the input/output processor 11*a* causes the illumination device 9 to start light emission. Specifically, the input/output processor 11*a* creates the aforementioned light emission control data and transmits it to the illumination device 9 via the extension connector 20. Upon receipt of the light emission control data, the microcomputer 28 of the illumination device 9 controls light emission by the light modules 29 in accordance with the light emission control data. Thereafter, the input/output processor 11*a* repeatedly transmits the light emission control data to continue light emission by the illumination device 9. As a result, the user can be made aware of message reception by the illumination device 9 emitting light. Following step S14, the input/output processor ends the data reception process shown in FIG. 18.

Note that in step S14, the input/output processor 11*a* may change the state of light emission by the illumination device 9 (e.g., light intensity, color, and light emission pattern) in accordance with the status of data reception. For example, the state of light emission by the illumination device 9 may be changed in accordance with the number of received messages, message senders, and types of received data (e.g., whether it is a message or game-related data). As a result, the state of light emission by the illumination device 9 allows the user to know information about received data (e.g., the type of received data).

As described above, according to the above variant, the game apparatus 3 causes the illumination device 9 to emit light in response to message reception, thereby making the user aware of message reception. Note that in the above variant, the game apparatus 3 causes the illumination device 9 to emit light in response to message reception, but in another embodiment, the illumination device 9 may be caused to emit light in response to reception of message data and other data (e.g., a game program or video data transmitted from a server) or reception of data other than message data.

Also, in the above variant, the game apparatus 3 causes the illumination device 9 to emit light in response to data reception only during the sleep mode, but in another embodiment, such a light emission operation may be performed during the normal mode as well.

(Variant in which the Illumination Device 9 is Controlled Differently in Accordance with Brightness)

Note that in another embodiment, the game system 1 may change the state of light emission by the illumination device 9 in accordance with ambient brightness. Specifically, the game system 1 includes a sensor (e.g., a light sensor) for detecting ambient brightness in addition to the features shown in FIG. 1, and the state of light emission by the illumination device 9 may be changed in accordance with a detection result by the sensor. Note that the sensor is preferably provided independently of the game apparatus 3 and can communicate with the game apparatus 3 in a wired or wireless manner. Also, the sensor is preferably installed around the television 2. For example, when it is determined to be relatively bright around the game system 1 based on a detection result by the sensor, the game apparatus 3 may control the state of light emission by the illumination device 9 to provide relatively bright light, and when it is determined to be relatively dark around the game system 1, the state of light emission by the illumination device 9 may be controlled to provide relatively low light. As a result, for example, the game system 1 can prevent the illumination device 9 from shedding excessively low light on a wall surface under high ambient light conditions or from shedding excessively high light under low ambient light conditions.

(Other Exemplary Game Systems)

In the above embodiment, the game system 1 has the marker device 6 provided as an accompanying device to be set around the television 2. Here, in another embodiment, the accompanying device may be the following device, for example. Specifically, the accompanying device may be a camera for picking up an image of a view forward from the television 2. At this time, the game apparatus 3 performs predetermined information processing based on the image picked up by the camera. Possible examples of the predetermined information processing include a process for controlling the game in accordance with the position of the user or input device in the picked up image, a process for displaying an image obtained by processing the picked up image, and a game process for using a portion of the picked up image (e.g., the user's face) as a game image.

Also, the accompanying device may be a device for outputting a predetermined signal, e.g., radio or ultrasonic, in place of the marker device 6 which outputs infrared light. In this case, as the input device, the controller 5 detects the predetermined signal, and the game apparatus 3 performs the predetermined information processing based on the detection result. For example, the game apparatus 3 performs a game process as the predetermined information processing, in which, for example, the position of the controller 5 is calculated from the detection result and the calculated position is used as a game input. Conversely, the input device may output the aforementioned predetermined signal, and the sensor for detecting the predetermined signal may be provide to the accompanying device.

Also, in another embodiment, the illumination device 9 may further include an audio output device such as a speaker. In such a case, in addition to the light emission control data, the game apparatus 3 further transmits data for specifying the sound to be outputted by the audio output device. The data may specify sound which is the same as or different from the sound (game sound) outputted by the speaker 2a of the television 2. Upon receipt of the data, the microcomputer 28 of the illumination device 9 controls the audio output device to output sound in accordance with the data. Thus, the illumination device 9 can provide audio effects to the user along with visual effects.

As described above, the present technology is applicable to, for example, game systems for displaying game images for the purpose of, for example, providing additional visual effects to the user along with images displayed on the screen.

While the technology presented herein has been described in detail, the foregoing description is in all aspects illustrative and not restrictive. It is understood that numerous other modifications and variations can be devised without departing from the scope of the present technology.

What is claimed is:

1. An image display system for displaying an image on a display screen, comprising:
   a light-emitting portion for emitting infrared light;
   a lighting portion for shedding visible light;
   a display control portion for performing predetermined information processing based on a detection result for the infrared light, thereby controlling image display on the display screen; and
   a lighting control portion for controlling lighting by the lighting portion, wherein
   the lighting portion sheds visible light toward a direction containing a component opposite to a direction in which the light emitting portion emits infrared light.

2. The image display system according to claim 1, further comprising an input device provided with an image pickup portion capable of detecting infrared light, wherein,
   the display control portion performs the predetermined information processing based on a position of the infrared light in an image picked up by the image pickup portion.

3. The image display system according to claim 1, wherein,
   the display control portion displays a game image on the display screen, the game image resulting from a game process performed by the predetermined information processing, and
   the lighting control portion controls lighting by the lighting portion in accordance with the game process.

4. The image display system according to claim 1, wherein the lighting control portion changes lighting by the lighting portion in accordance with the image on the display screen.

5. The image display system according to claim 1, further comprising an operation-receiving portion for receiving a user operation, wherein,
   the lighting control portion changes lighting by the lighting portion in accordance with the user operation received by the operation-receiving portion.

6. The image display system according to claim 1, further comprising an audio output portion for outputting a sound based on the predetermined information processing, wherein, the lighting control portion changes lighting by the lighting portion in accordance with the sound outputted by the audio output portion.

7. The image display system according to claim 1, wherein, the light-emitting portion is disposed so as to emit infrared light forward from the display screen, and
the lighting portion is disposed so as to emit visible light rearward from the display screen.

8. The image display system according to claim 1, further comprising:
a first housing having the light-emitting portion provided therein, and
a second housing provided independently of the first housing, the second housing having the lighting portion provided therein.

9. The image display system according to claim 8, wherein the second housing is detachable from the first housing.

10. The image display system according to claim 1, further comprising a housing having the light-emitting portion and the lighting portion accommodated therein.

11. The image display system according to claim 10, wherein the lighting portion is disposed in the housing such that the lighting portion is directed to emit visible light in a direction opposite to a direction in which the light-emitting portion emits infrared light.

12. The image display system according to claim 1, wherein the lighting portion emits a plurality of rays of visible light each having an elongated cross section.

13. The image display system according to claim 1, wherein the lighting portion includes:
a first emitter portion for emitting a plurality of rays of visible light in different directions from each other; and
a second emitter portion for emitting visible light in such a direction so as to overlap with the rays of visible light emitted by the first emitter portion, the visible light having a wider cross section than those of the rays of visible light.

14. The image display system according to claim 1, wherein,
the lighting portion includes light-emitting components capable of emitting light in a plurality of colors, and
the lighting control portion at least controls the light to be emitted by the light-emitting component in terms of color.

15. The image display system according to claim 1, further comprising:
a communication portion for communicating with another device; and
a power control portion capable of power-saving control for supplying no power at least to the display control portion while supplying power to the communication portion, wherein,
when the power control portion performs the power-saving control, the lighting control portion controls lighting by the lighting portion upon reception of the predetermined data by the communication portion.

16. The image display system according to claim 1, further comprising a brightness detection portion for detecting ambient brightness, wherein,
the lighting control portion changes lighting by the lighting portion in accordance with the detection result by the brightness detection portion.

17. An image display system for displaying an image on a display screen, comprising:
an image pickup portion for picking up an image of a view forward from the display screen;
a lighting portion for shedding visible light;
a display control portion for performing predetermined information processing based on the image picked up by the image pickup portion, thereby controlling image display on the display screen; and
a lighting control portion for controlling lighting by the lighting portion when the image is displayed on the display screen, wherein
the lighting portion sheds visible light toward a direction containing a component opposite to an image pickup direction of the image pickup portion.

18. An illumination device detachably connected to a display control device for controlling a display device to display an image, comprising:
a light-emitting portion for emitting infrared light;
a reception portion for receiving a control instruction based on a detection result for the infrared light from the display control device;
a lighting portion for shedding visible light rearward from the display device in accordance with the control instruction received by the reception portion; and
a housing including the light-emitting portion and the lighting portion therein.

19. The illumination device according to claim 18, wherein the lighting portion includes:
a first emitter portion for emitting a plurality of rays of visible light in different directions from each another, each ray having an elongated cross section; and
a second emitter portion for emitting visible light in such a direction so as to overlap with the rays of visible light emitted by the first emitter portion, the light emitted by the second emitter portion having a wider cross section than the rays of visible light emitted by the first emitter portion.

20. An image display system for displaying an image on a display screen, comprising:
an image pickup portion;
a lighting portion for shedding visible light;
a display control portion for performing predetermined information processing based on the image picked up by the image pickup portion, thereby controlling image display on the display screen;
a lighting control portion for controlling lighting by the lighting portion when the image is displayed on the display screen; and
a housing including the image pickup portion and the lighting portion therein.

21. An illumination device detachably connected to a display control device for controlling a display device to display an image, comprising:
an image pickup portion;
a lighting portion for shedding visible light when an image is displayed on the display device by predetermined information processing performed based on the image picked up by the image pickup portion; and
a housing including the image pickup portion and the lighting portion therein.

22. An image display system for displaying an image on a display screen, comprising:
an image pickup portion for picking up an image of a view forward from the display screen;
a lighting portion for shedding visible light;
a display control portion for performing predetermined information processing based on the image picked up by the image pickup portion, thereby controlling image display on the display screen; and a lighting control portion for controlling lighting by the lighting portion when the image is displayed on the display screen, wherein:

the image pickup portion picks up an image of a user in front of the display screen; and the lighting portion sheds visible light on a wall surface behind the display screen.

\* \* \* \* \*

UNITED STATES PATENT AND TRADEMARK OFFICE
CERTIFICATE OF CORRECTION

PATENT NO. : 8,602,891 B2  
APPLICATION NO. : 12/877547  
DATED : December 10, 2013  
INVENTOR(S) : Kondo et al.

Page 1 of 1

It is certified that error appears in the above-identified patent and that said Letters Patent is hereby corrected as shown below:

On the Title Page, item (56) under "US PATENT DOCUMENTS" insert  
--2008/0119281   5/2008   Hirose et al.--; and On the Title Page, item (56) under "FOREIGN PATENT DOCUMENTS" insert  
--JP   2008-125614   6/2008--.

Signed and Sealed this  
Fifteenth Day of April, 2014

Michelle K. Lee  
*Deputy Director of the United States Patent and Trademark Office*